(12) United States Patent
Ishida

(10) Patent No.: US 12,466,197 B2
(45) Date of Patent: Nov. 11, 2025

(54) DATA PROTECTOR, DATA PROTECTION SEAL, AND DRAWING DEVICE

(71) Applicant: Sony Group Corporation, Tokyo (JP)

(72) Inventor: Takehisa Ishida, Tokyo (JP)

(73) Assignee: Sony Group Corporation, Tokyo (JP)

( * ) Notice: Subject to any disclaimer, the term of this patent is extended or adjusted under 35 U.S.C. 154(b) by 433 days.

(21) Appl. No.: 17/436,138

(22) PCT Filed: Feb. 13, 2020

(86) PCT No.: PCT/JP2020/005432
§ 371 (c)(1),
(2) Date: Sep. 3, 2021

(87) PCT Pub. No.: WO2020/189104
PCT Pub. Date: Sep. 24, 2020

(65) Prior Publication Data
US 2022/0126596 A1 Apr. 28, 2022

(30) Foreign Application Priority Data
Mar. 20, 2019 (JP) ................... 2019-052744

(51) Int. Cl.
*B41J 2/475* (2006.01)
*B41M 5/28* (2006.01)
*B41M 5/46* (2006.01)

(52) U.S. Cl.
CPC ............ *B41J 2/4753* (2013.01); *B41M 5/28* (2013.01); *B41M 5/46* (2013.01); *B41J 2002/4756* (2013.01)

(58) Field of Classification Search
CPC .. B41J 2/4753; B41J 2002/4756; B41M 5/28; B41M 5/46; B32B 27/08; B32B 2307/4026
(Continued)

(56) References Cited

U.S. PATENT DOCUMENTS 6,280,891 B2 * 8/2001 Daniel ............... G06K 7/10861
430/1
6,511,756 B1 * 1/2003 Obuchi .................. C08G 61/08
428/517

(Continued)

FOREIGN PATENT DOCUMENTS

CN 1820963 A 8/2006
CN 101035671 A 9/2007
(Continued)

OTHER PUBLICATIONS

International Search Report issued in International Patent Application No. PCT/JP2020/005432 on Apr. 14, 2020 and English translation of same. 7 pages.

(Continued)

*Primary Examiner* — Justin V Lewis
(74) *Attorney, Agent, or Firm* — K&L Gates LLP

(57) ABSTRACT

A data protector according to an embodiment of the present disclosure includes: a data layer configured to record confidential information as a visible image; and one or a plurality of cover layers disposed at least one of above or below the data layer and configured to transition between a color-developed state and a decolored state in a visible wavelength region.

18 Claims, 14 Drawing Sheets

(58) Field of Classification Search
USPC ..... 40/124.01, 446, 584; 283/72, 74, 89, 94, 283/98, 901
See application file for complete search history.

(56) References Cited

U.S. PATENT DOCUMENTS

| | | | |
|---|---|---|---|
| 2009/0285074 A1* | 11/2009 | Wisnudel | G11B 20/00086 369/100 |
| 2010/0237605 A1 | 9/2010 | Vidler et al. | |
| 2012/0263893 A1 | 10/2012 | Endres | |
| 2016/0096105 A1* | 4/2016 | Cove | A63F 3/0665 427/258 |
| 2018/0306648 A1 | 10/2018 | Park | |

FOREIGN PATENT DOCUMENTS

| | | |
|---|---|---|
| CN | 101104350 A | 1/2008 |
| CN | 101791918 A | 8/2010 |
| CN | 102770280 A | 11/2012 |
| CN | 108352135 A | 7/2018 |
| EP | 1798026 A | 6/2007 |
| JP | H07-73490 A | 3/1995 |
| JP | 2003-073579 A | 3/2003 |
| JP | 2003-145965 A | 5/2003 |
| JP | 2004-272177 A | 9/2004 |
| JP | 2004-334824 A | 11/2004 |
| JP | 2006103048 A | 4/2006 |
| JP | 2007-065266 A | 3/2007 |
| JP | 2007271965 A | 10/2007 |
| JP | 2010032684 A | 2/2010 |
| JP | 2013-076799 A | 4/2013 |

OTHER PUBLICATIONS

Written Opinion issued in International Patent Application No. PCT/JP2020/005432 on Apr. 14, 2020. 4 pages.

* cited by examiner

[FIG. 1]
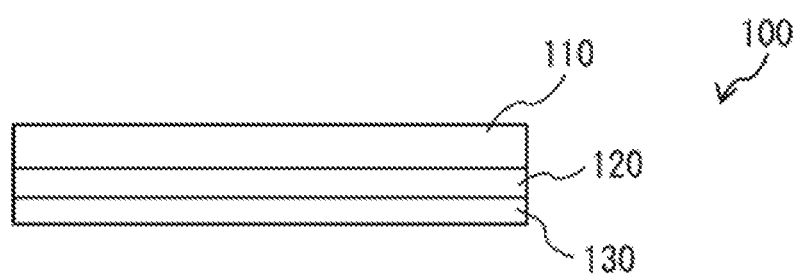
[FIG. 2]
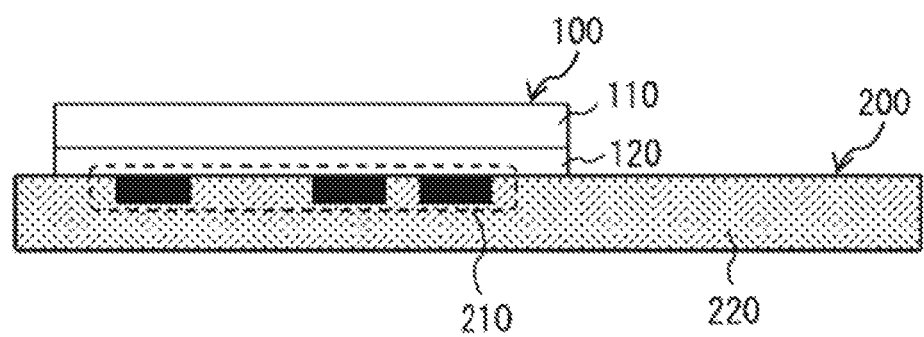

[FIG. 3]
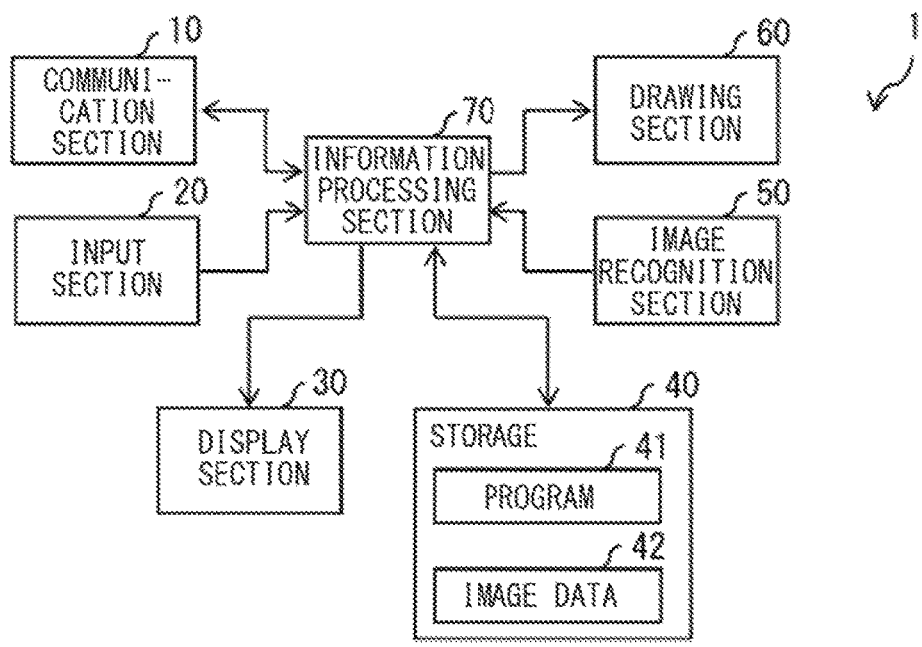
[FIG. 4]
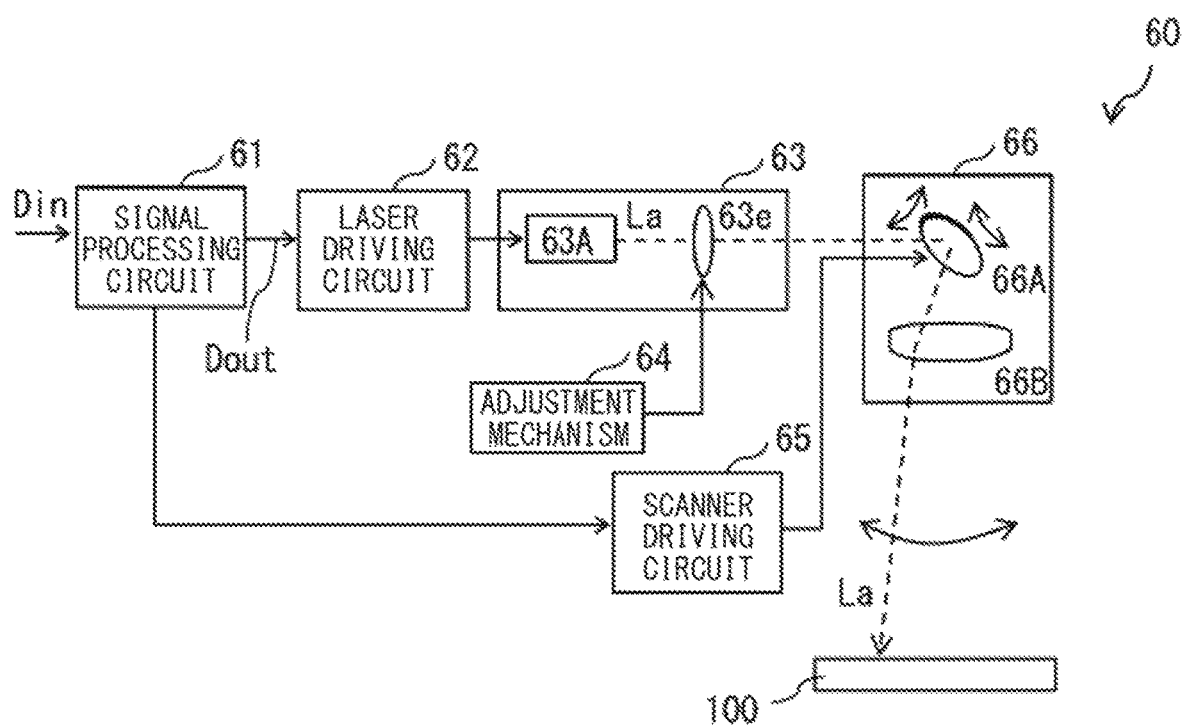

[ FIG. 5 ]
WRITING
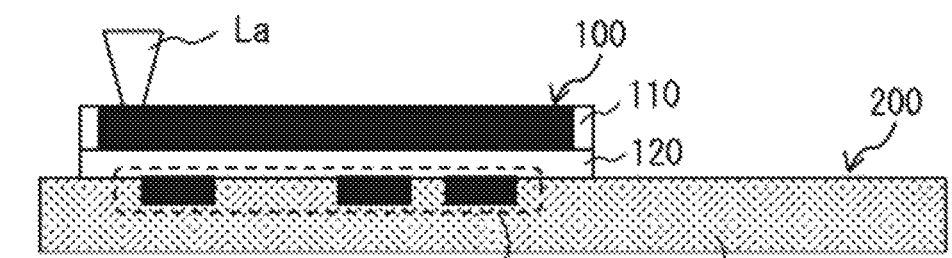
ERASING
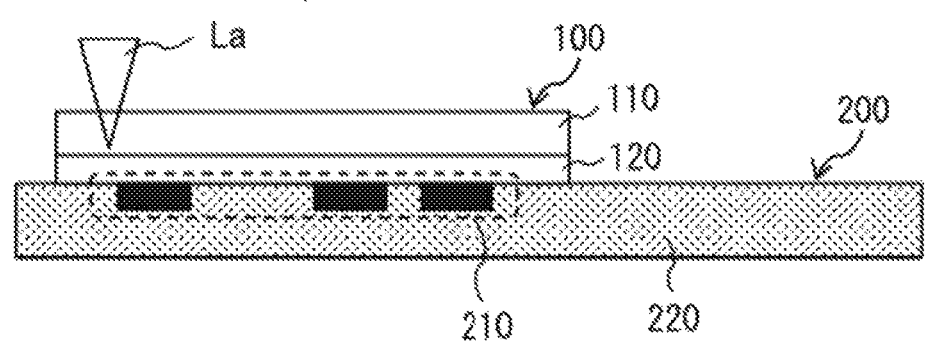
[ FIG. 6 ]
WRITING
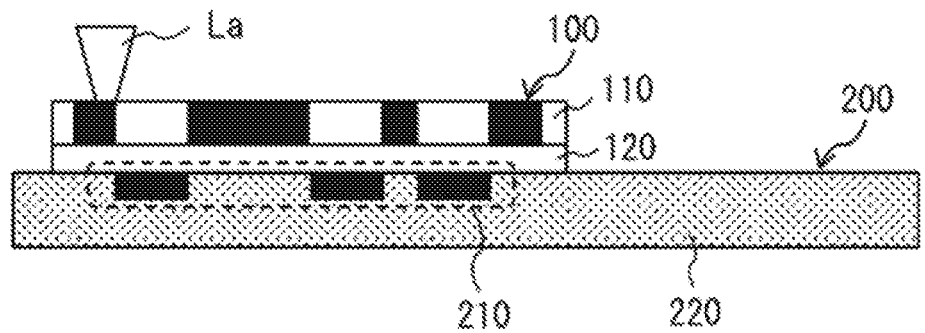

[FIG. 7]
WRITING
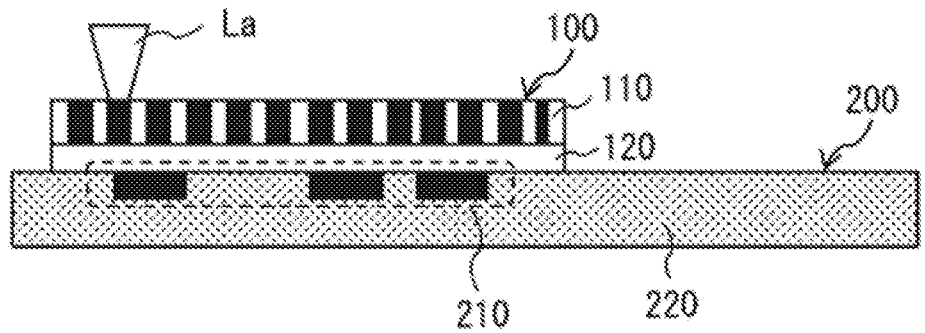
[FIG. 8]
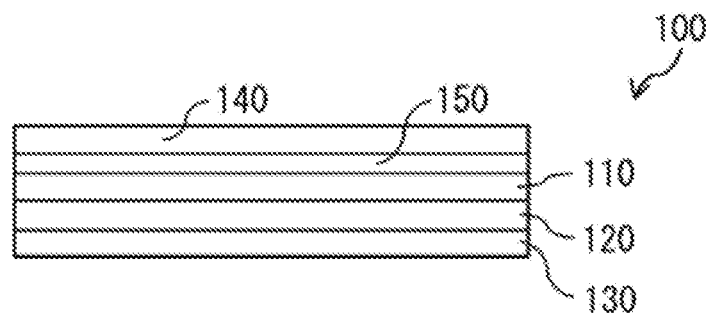
[FIG. 9]
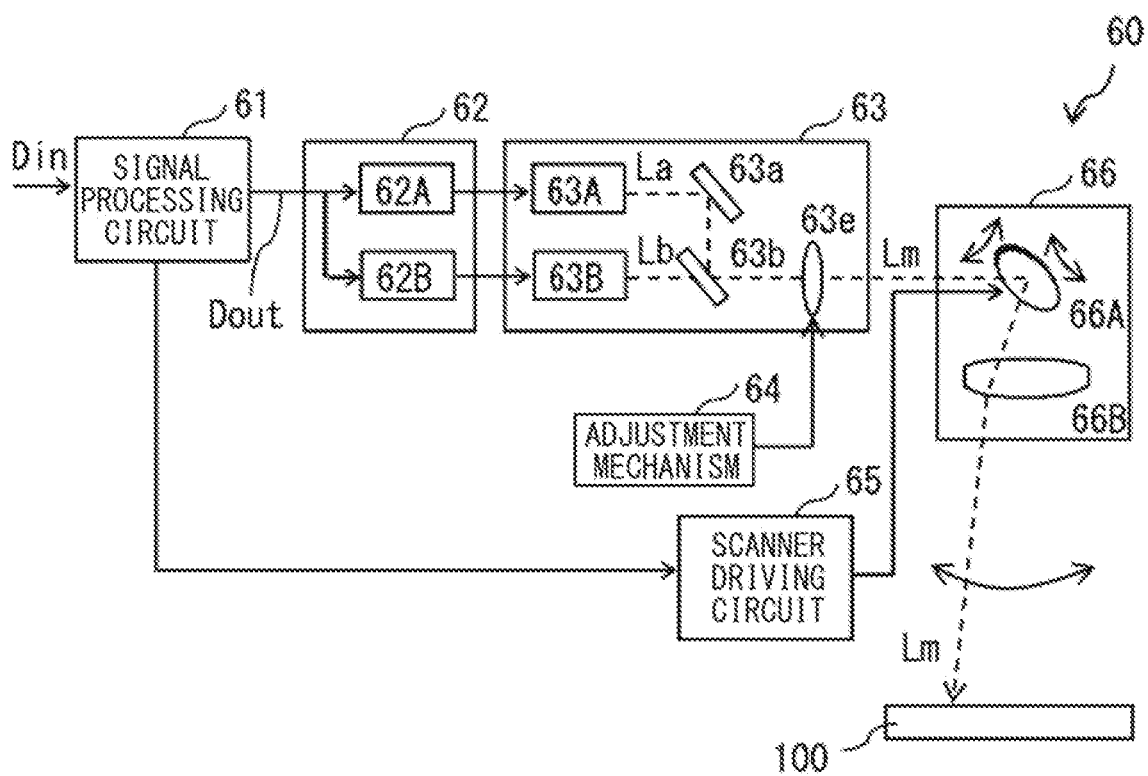

[ FIG. 10 ]
WRITING
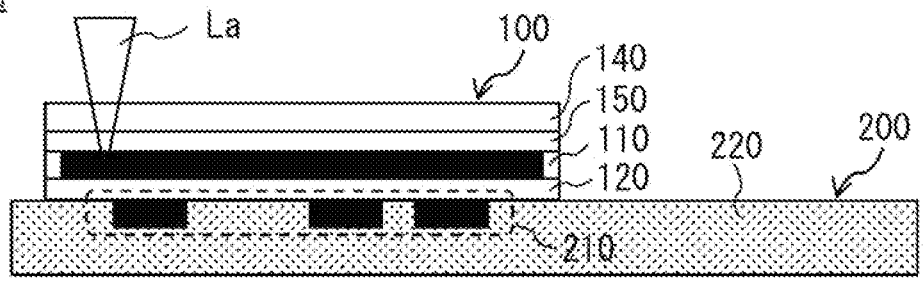
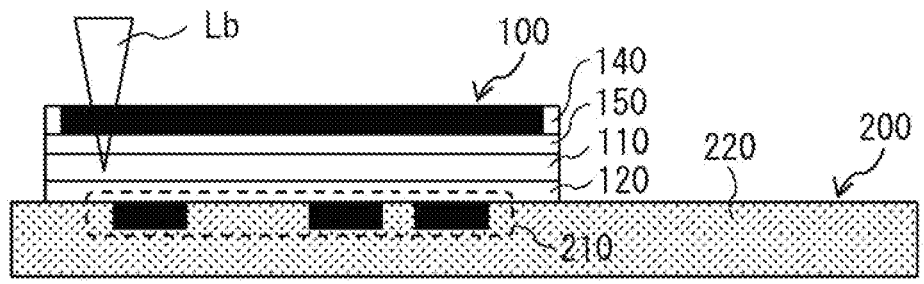
[ FIG. 11 ]
ERASING
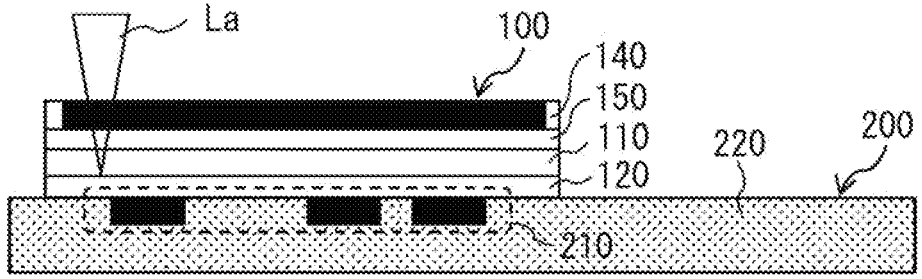
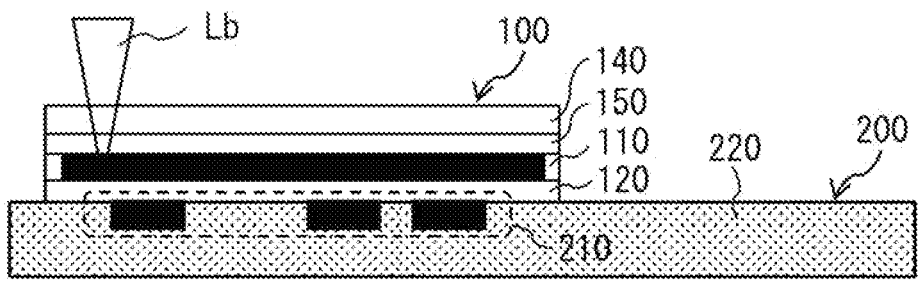
[ FIG. 12 ]
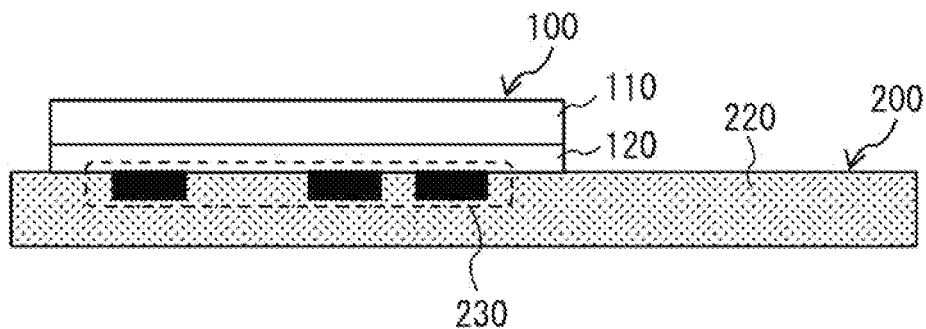

[FIG. 13]
WRITING
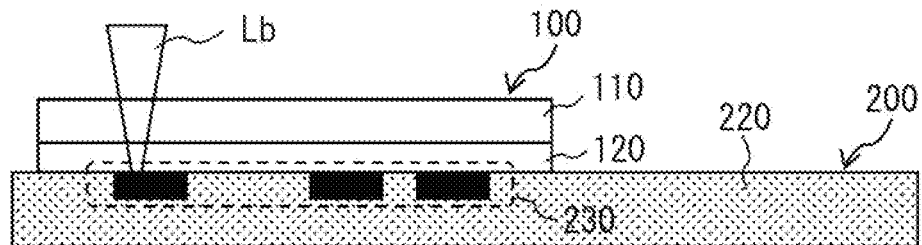
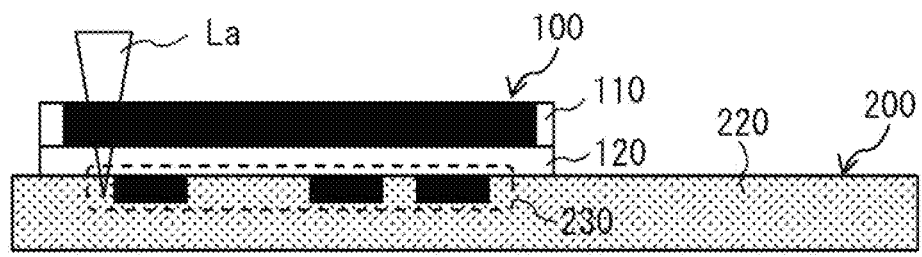
[FIG. 14]
ERASING
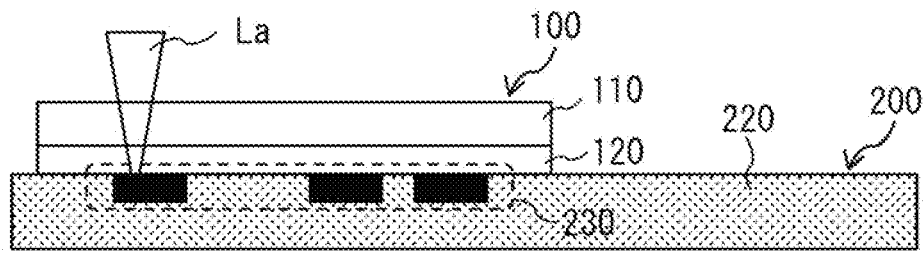
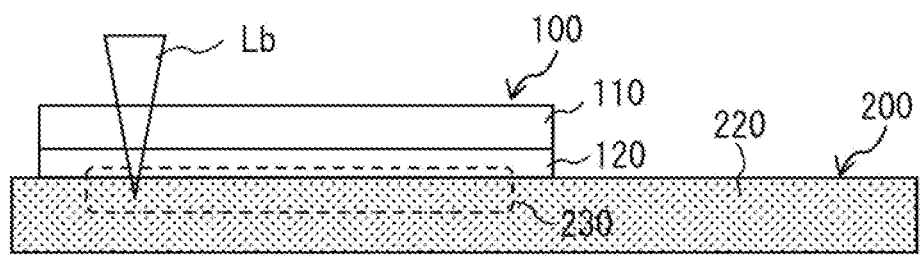
[FIG. 15]
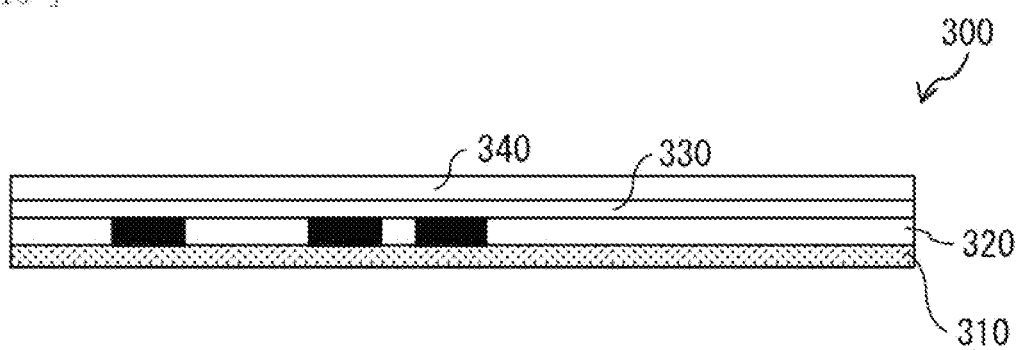

[FIG. 16]
WRITING
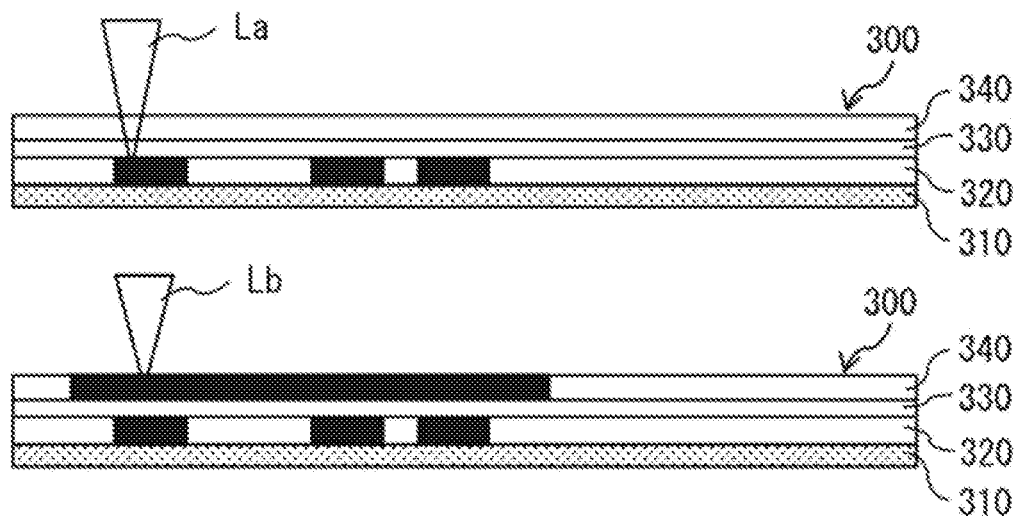
[FIG. 17]
ERASING
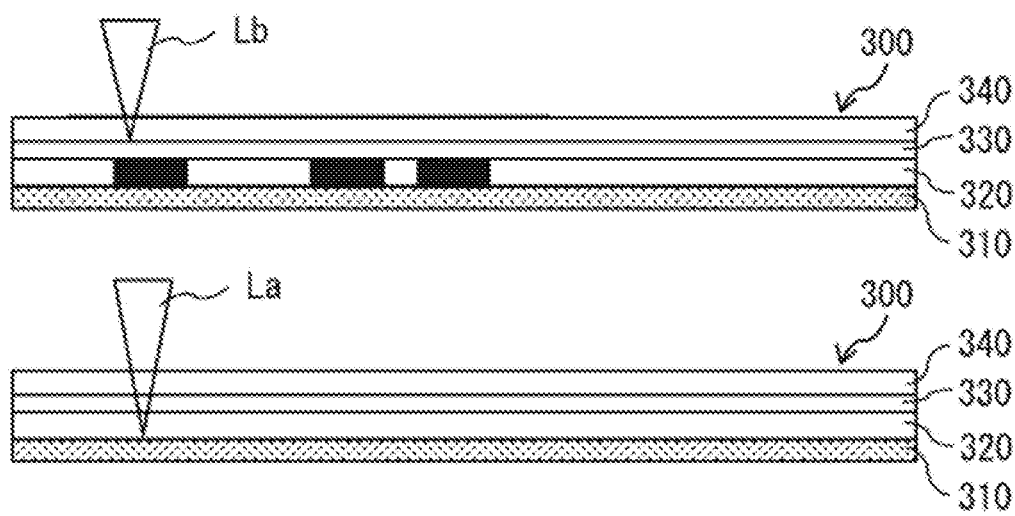
[FIG. 18]
WRITING
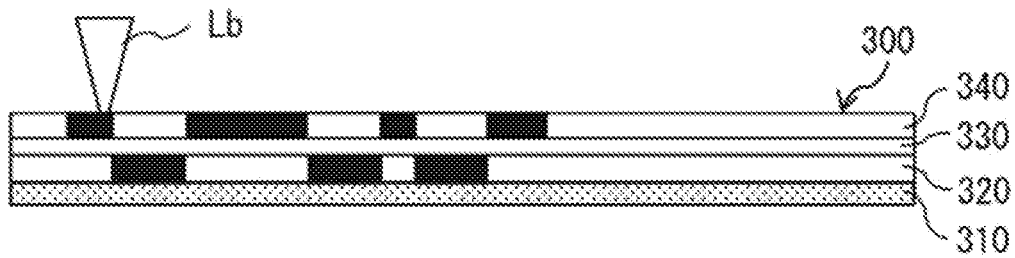

[ FIG. 19 ]
WRITING
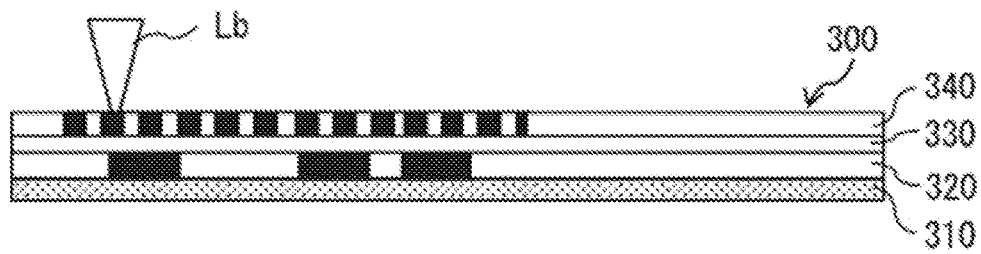
[ FIG. 20 ]
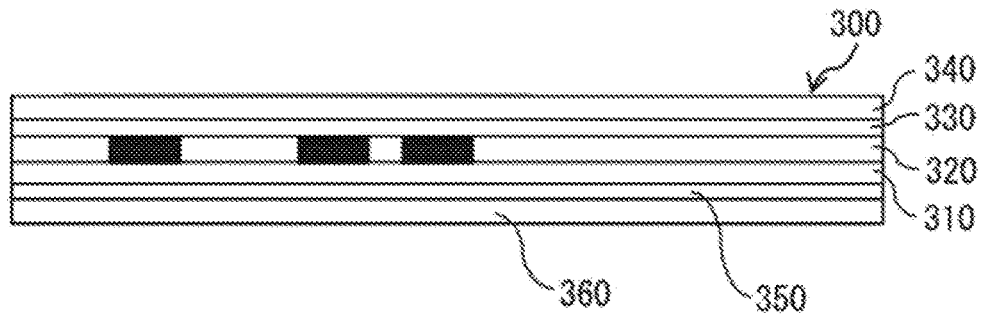
[ FIG. 21 ]
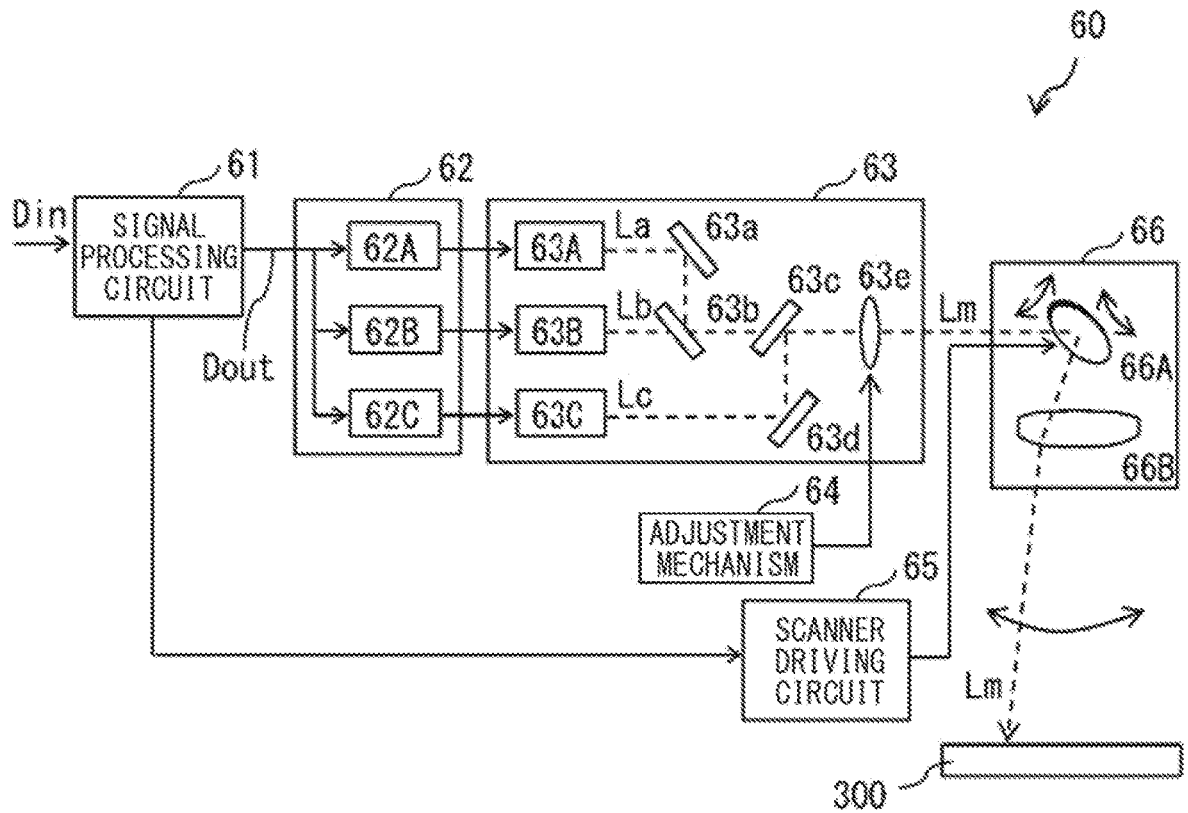

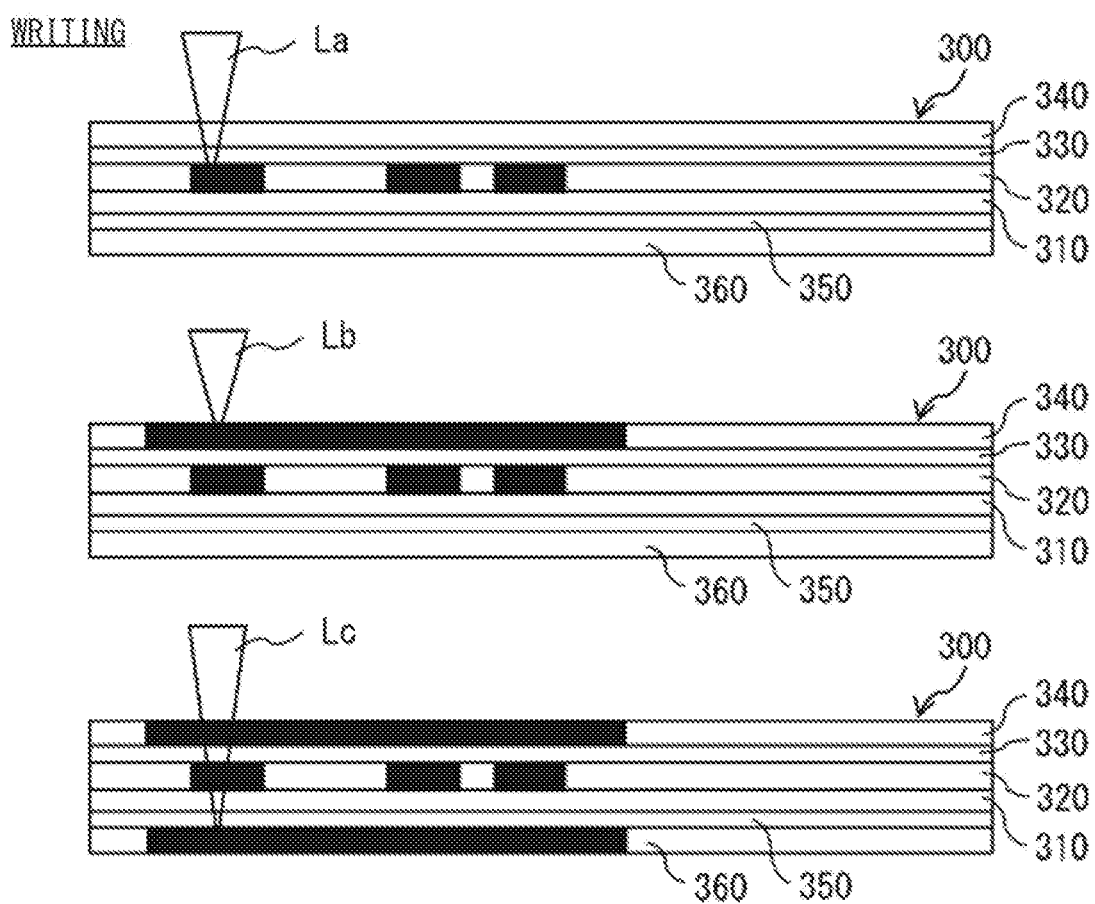

[FIG. 23]
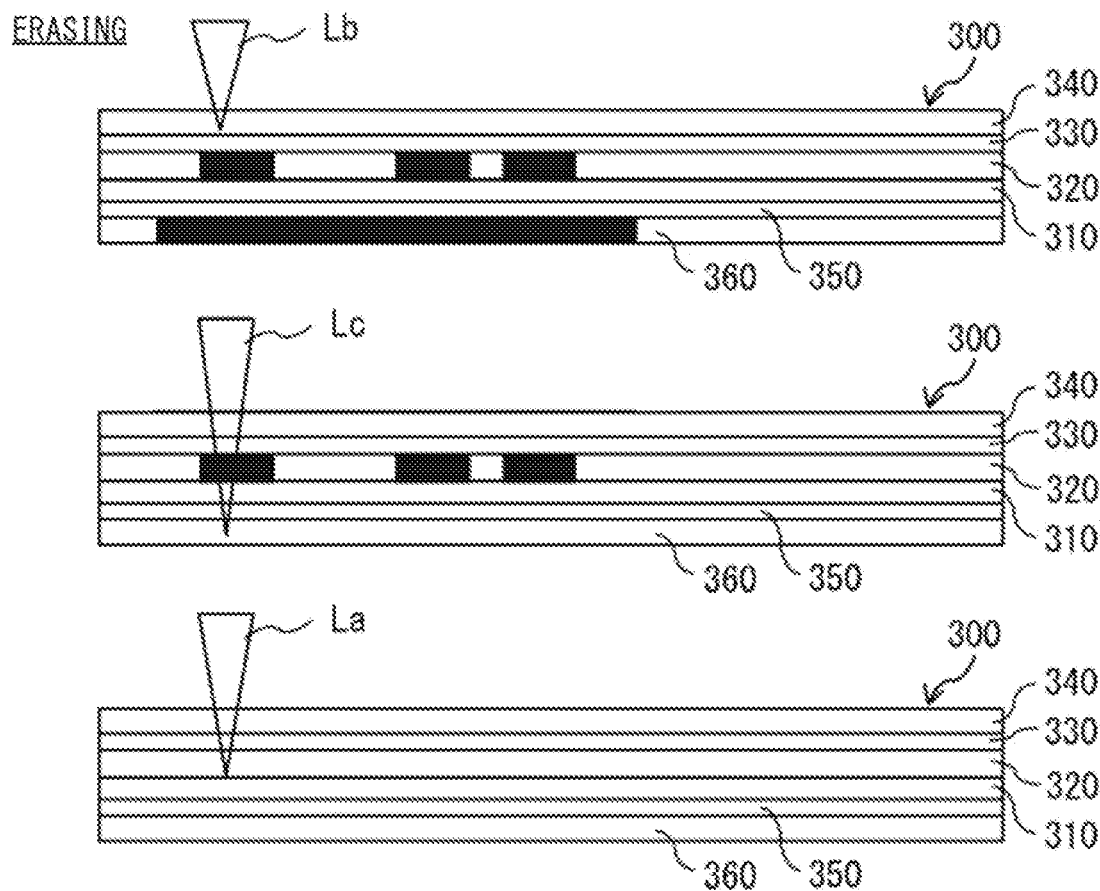
[FIG. 24]
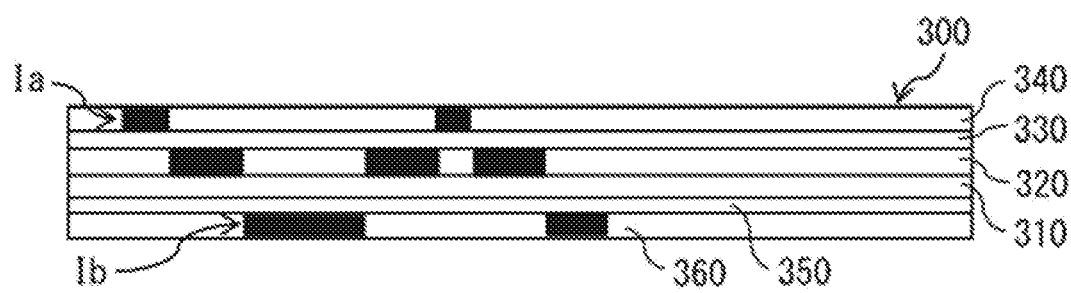

[FIG. 25]
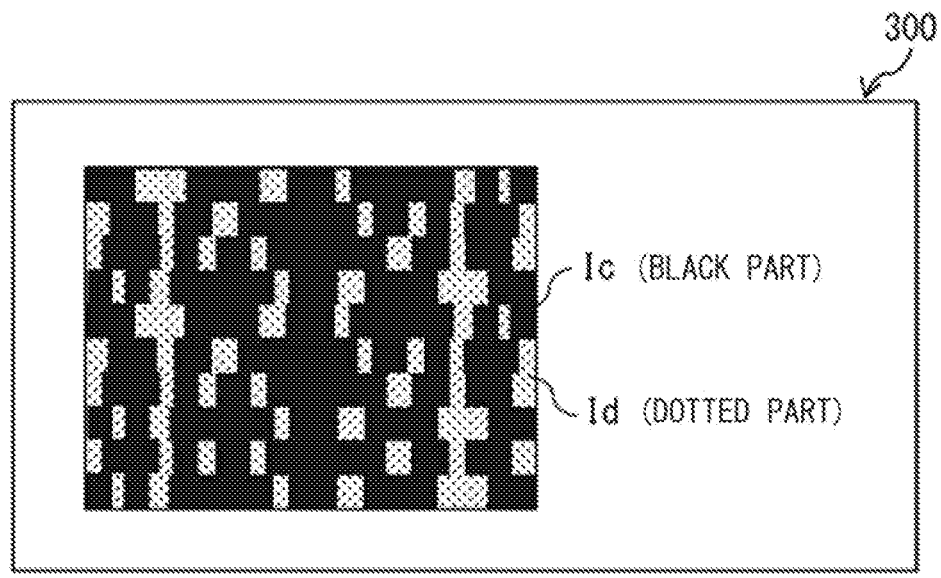
[FIG. 26]
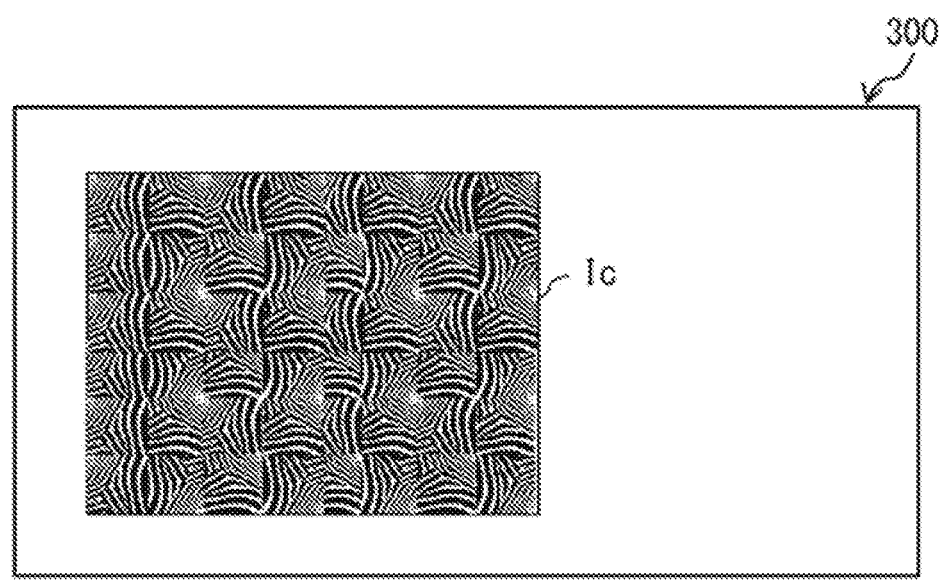
[FIG. 27]
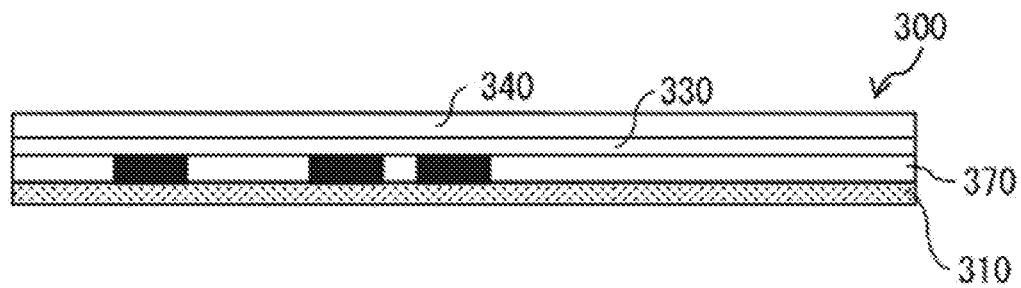

[FIG. 28]
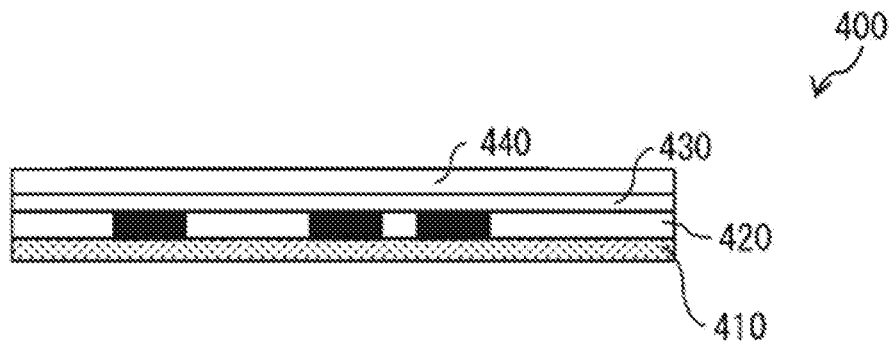
[FIG. 29]
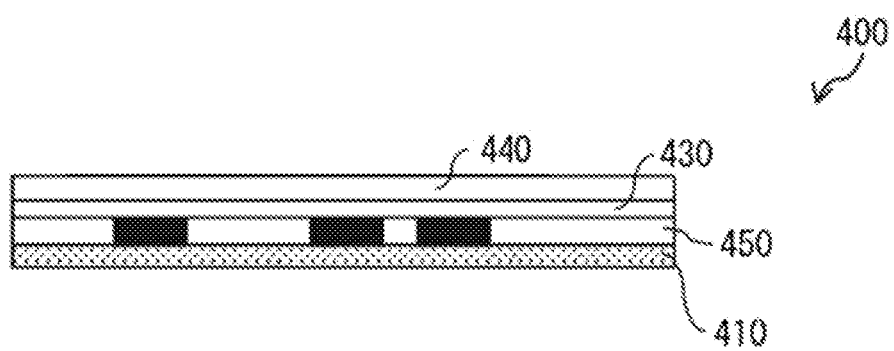
[FIG. 30]
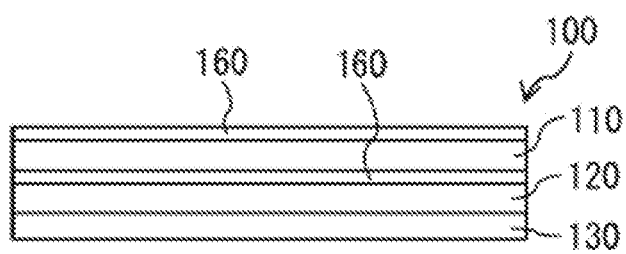
[FIG. 31]
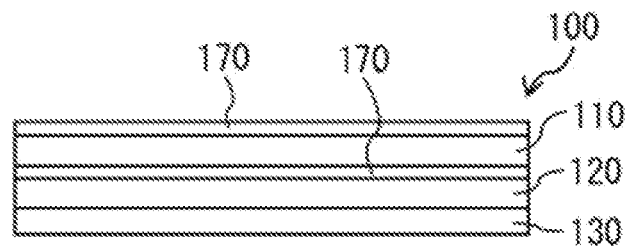

[FIG. 32]
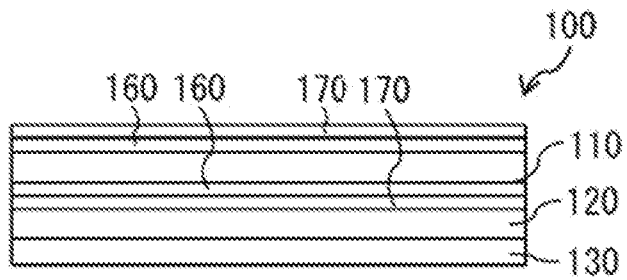
[FIG. 33]
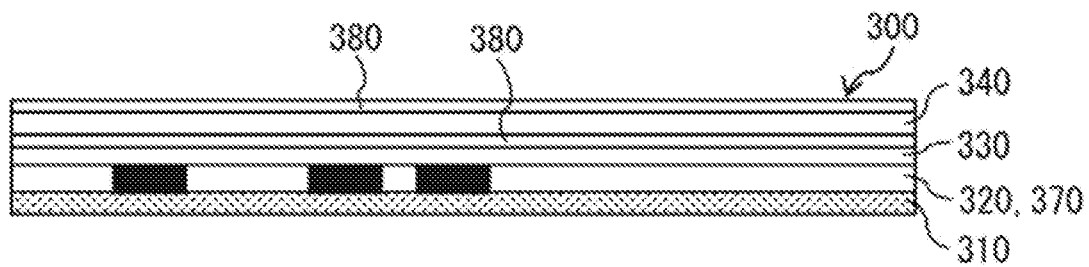
[FIG. 34]
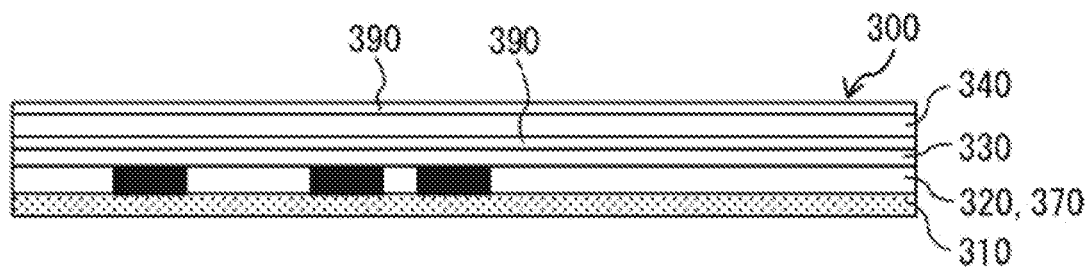
[FIG. 35]
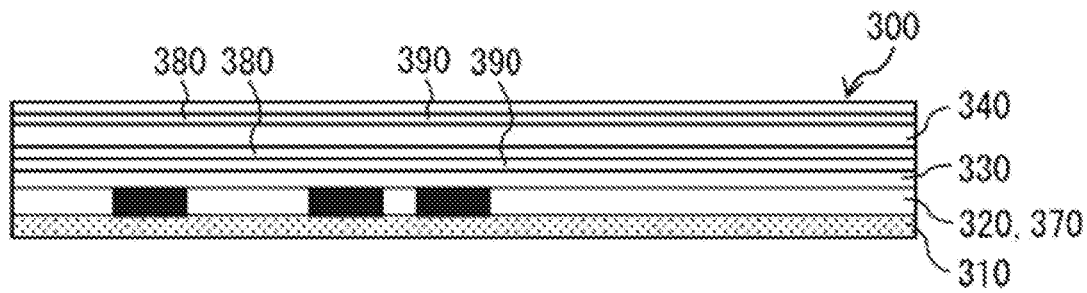
[FIG. 36]
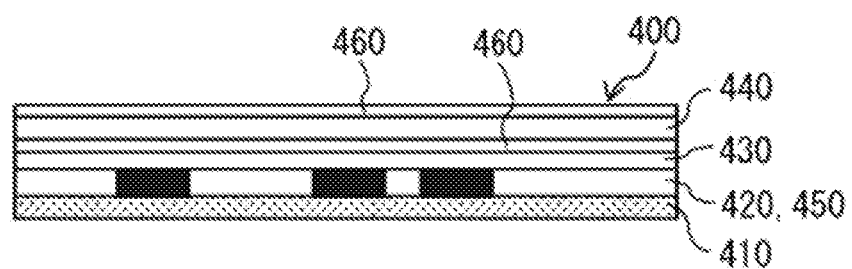

[ FIG. 37 ]
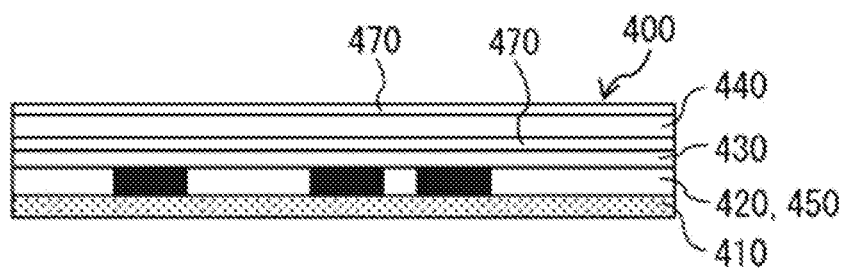
[ FIG. 38 ]
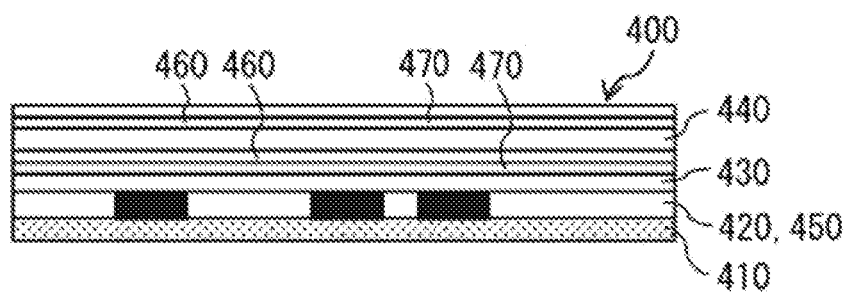

DATA PROTECTOR, DATA PROTECTION SEAL, AND DRAWING DEVICE

TECHNICAL FIELD

The present disclosure relates to a data protector, a data protection seal, and a drawing device.

BACKGROUND ART

In a case where important information such as passwords and cryptographic secret keys is stored for a long period of time and stored on a recording medium connected to a computer, there has been an issue in that the stored information is stolen by a third party or becomes unreadable due to hacking or failure of a device. At present, a method of printing on paper and storing it is considered to be the safest. However, a risk of leakage of information due to illegal viewing by a third party or loss of printing due to deterioration of paper or ink is not zero. For example, a disclosure described in the following PTL 1 is conceivable as a measure for suppressing the illegal viewing of a third party.

CITATION LIST

Patent Literature

PTL 1: Japanese Unexamined Patent Application Publication No. 2007-65266

SUMMARY OF THE INVENTION

However, in the disclosure described in PTL 1, there is an issue that visualization is not achieved without using an infrared sensor. It is therefore desirable to provide a data protector and a data protection seal that are able to be visualized in a visible wavelength region. Further, it is also desirable to provide a drawing device for making such a data protector and data protection seal visible or invisible.

A first data protector according to an embodiment of the present disclosure includes: a data layer configured to record confidential information as a visible image; and one or a plurality of cover layers disposed at least one of above or below the data layer and configured to transition between a color-developed state and a decolored state in a visible wavelength region.

A second data protector according to an embodiment of the present disclosure includes: a data layer on which record confidential information is recorded as a visible image; and one or a plurality of cover layers disposed at least one of above or below the data layer and configured to transition between a color-developed state and a decolored state in a visible wavelength region.

In the first and second data protectors according to an embodiment of the present disclosure, the one or the plurality of cover layers configured to transition between the color-developed state and the decolored state in the visible wavelength region is disposed at least one of above or below the data layer. This allows confidential information to be concealed, for example, by turning the one or the plurality of cover layers into the color-developed state to turn the data layer into an invisible state, or by preventing, by the cover layer, the confidential information from being recognized. Further, it is possible to visually recognize the confidential information in the visible wavelength region by turning the one or the plurality of cover layers into the decolored state to turn the data layer into a visible state.

A first data protection seal according to an embodiment of the present disclosure is a seal that protects a data layer configured to record confidential information as a visible image. The data protection seal includes: one or a plurality of cover layers configured to control visibility and invisibility of the confidential information in a visible wavelength region; and an adhesive layer provided at a position opposed to the one or the plurality of cover layers.

A second data protection seal according to an embodiment of the present disclosure is a seal that protects a data layer on which confidential information is recorded as a visible image. The data protection seal includes: one or a plurality of cover layers configured to control visibility and invisibility of the confidential information in a visible wavelength region; and an adhesive layer provided at a position opposed to the one or the plurality of cover layers.

In the first and second data protection seals according to an embodiment of the present disclosure, for example, it is possible to conceal the confidential information, for example, by attaching the first and second data protection seals to the data layer and turning the one or the plurality of cover layers into a color-developed state to turn the data layer into an invisible state, or by preventing, by the cover layer, the confidential information from being recognized. Further, it is possible to visually recognize the confidential information in the visible wavelength region by turning the one or the plurality of cover layers into a decolored state to turn the data layer into a visible state.

A drawing device according to an embodiment of the present disclosure is a device that performs at least one of writing or erasing on a data protector. Here, the data protector includes: a data layer on which confidential information is to be recorded as a visible image, the data layer including a first reversible material configured to control color development and decoloring in a visible wavelength region; and one or a plurality of cover layers including a second reversible material configured to control color development and decoloring in the visible wavelength region and being disposed at least one of above or below the data layer. The drawing device includes a light source section and an optical section. The light source section emits laser light beams, the laser light beams being at least one of a first laser light beam or a second laser light beam. The first laser light beam has a condition in which a reaction of color development and decoloring of the first reversible material does not occur and in which a reaction of any one of color development and decoloring of the second reversible material occurs. The second laser light beam has a condition in which a reaction of color development and decoloring of the second reversible material does not occur and in which a reaction of any one of color development and decoloring of the first reversible material occurs. The optical section performs at least one of writing or erasing on the data layer or the one or the plurality of cover layers by applying the laser light beams emitted from the light source section on the data layer or the one or the plurality of cover layers.

In the drawing device according to an embodiment of the present disclosure, at least one of writing or erasing on the one or the plurality of cover layers is performed by applying the laser light beam emitted from the light source section on the one or the plurality of cover layers. This allows confidential information to be concealed, for example, by performing writing on the data protector by the drawing device to turn the one or the plurality of cover layers into the color-developed state to turn the data layer into an invisible state, or by preventing, by the one or the plurality of cover layers, the confidential information from being recognized.

Further, by performing erasing on the one or the plurality of cover layers by the drawing device, the one or the plurality of cover layers is turned into the decolored state to turn the data layer into the visible state, thereby making is possible to make the confidential information visually recognized in the visible wavelength region. Further, in the drawing device according to an embodiment of the present disclosure, at least one of writing or erasing is performed on the data layer by applying the laser light beam emitted from the light source section on the data layer. This allows the drawing device to write the confidential information to the data layer by performing writing on the data protector. Further, it is possible to erase the data layer by performing erasing on the data layer by the drawing device.

BRIEF DESCRIPTION OF DRAWINGS

FIG. 1 is a diagram illustrating a cross-sectional configuration example of a data protection seal according to a first embodiment of the present disclosure.

FIG. 2 is a diagram illustrating a state in which the data protection seal of FIG. 1 is attached to a document.

FIG. 3 is a diagram illustrating a schematic configuration example of a drawing device that performs drawing on the data protection seal of FIG. 1.

FIG. 4 is a diagram illustrating a schematic configuration example of a scanner section of FIG. 3.

FIG. 5 is a diagram illustrating an example of writing and erasing on the data protection seal using the drawing device of FIG. 3.

FIG. 6 is a diagram illustrating a modification example of the writing of FIG. 5.

FIG. 7 is a diagram illustrating a modification example of the writing of FIG. 5.

FIG. 8 is a diagram illustrating a modification example of a cross-sectional configuration of the data protection seal of FIG. 1.

FIG. 9 is a diagram illustrating a modification example of a schematic configuration of the scanner section of FIG. 4.

FIG. 10 is a diagram illustrating an example of writing on the data protection seal of FIG. 8.

FIG. 11 is a diagram illustrating an example of erasing on the data protection seal of FIG. 8.

FIG. 12 is a diagram illustrating a modification example of a cross-sectional configuration of the document illustrated in FIG. 2.

FIG. 13 is a diagram illustrating an example of writing on the data protection seal that is attached to the document illustrated in FIG. 12.

FIG. 14 is a diagram illustrating an example of erasing on the data protection seal that is attached to the document illustrated in FIG. 12.

FIG. 15 is a diagram illustrating a cross-sectional configuration example of a document according to a second embodiment of the present disclosure.

FIG. 16 is a diagram illustrating an example of writing on the document of FIG. 15.

FIG. 17 is a diagram illustrating an example of erasing on the document of FIG. 15.

FIG. 18 is a diagram illustrating a modification example of the writing of FIG. 16.

FIG. 19 is a diagram illustrating a modification example of the writing of FIG. 16.

FIG. 20 is a diagram illustrating a modification example of the cross-sectional configuration of the document of FIG. 15.

FIG. 21 is a diagram illustrating a modification example of the schematic configuration of the scanner section of FIG. 4.

FIG. 22 is a diagram illustrating an example of writing on the document of FIG. 20.

FIG. 23 is a diagram illustrating an example of erasing on the document of FIG. 20.

FIG. 24 is a diagram illustrating a cross-sectional configuration example of a document on which writing has been performed.

FIG. 25 is a diagram illustrating a plane configuration example of the document of FIG. 24.

FIG. 26 is a diagram illustrating a modification example of a plane configuration of a document on which writing has been performed.

FIG. 27 is a diagram illustrating a modification example of the cross-sectional configuration of the document of FIG. 15.

FIG. 28 is a diagram illustrating a cross-sectional configuration example of a card according to a third embodiment of the present disclosure.

FIG. 29 is a diagram illustrating a modification example of the cross-sectional configuration example of the card of FIG. 28.

FIG. 30 is a diagram illustrating a modification example of the cross-sectional configuration of the data protection seal of FIG. 1.

FIG. 31 is a diagram illustrating a modification example of the cross-sectional configuration of the data protection seal of FIG. 1.

FIG. 32 is a diagram illustrating a modification example of the cross-sectional configuration of the data protection seal of FIG. 1.

FIG. 33 is a diagram illustrating a modification example of the cross-sectional configuration of the document of FIG. 15.

FIG. 34 is a diagram illustrating a modification example of the cross-sectional configuration of the document of FIG. 15.

FIG. 35 is a diagram illustrating a modification example of the cross-sectional configuration of the document of FIG. 15.

FIG. 36 is a diagram illustrating a modification example of the cross-sectional configuration of the card of FIG. 28.

FIG. 37 is a diagram illustrating a modification example of the cross-sectional configuration of the card of FIG. 28.

FIG. 38 is a diagram illustrating a modification example of the cross-sectional configuration of the card of FIG. 28.

MODES FOR CARRYING OUT THE INVENTION

In the following, some embodiments of the present disclosure are described in detail with reference to the drawings. It is to be noted that description is given in the following order.

1. First Embodiment (FIGS. 1 to 5)

An example in which a data protection seal is provided with one cover layer

2. Modification Examples of First Embodiment

Modification Example A (FIGS. 6 and 7)

An example in which inverted image data and complicated patterned image data are written on the cover layer Modification Example B An example in which the cover layer includes a photochromic material Modification Example C An example in which the cover layer includes a phase change material Modification Example D (FIGS. 8 to 11)

An example in which a data protection seal is provided with two cover layers

Modification Example E (FIGS. 12 to 14)

An example in which a data layer is reversible

3. Second Embodiment (FIGS. 15 to 17)

An example in which a document is provided with one cover layer

4. Modification Examples of Second Embodiment

Modification Example F (FIGS. 18 and 19)

An example in which inverted image data and complicated patterned image data are written on the cover layer Modification Example G An example in which the cover layer includes a photochromic material Modification Example H An example in which the cover layer includes a phase change material Modification Example I (FIGS. 20 to 23)

An example in which the document is provided with two cover layers

Modification Example J (FIGS. 24 to 26)

An example in which inverted image data and complicated patterned image data are written on each of a plurality of cover layers in Modification Example I Modification Example K (FIG. 27)

An example in which a data layer is irreversible

5. Third Embodiment (FIG. 28)

An example in which a card is provided with one cover layer

6. Modification Examples of Third Embodiment

Modification Example L (FIG. 29)

An example in which a data layer is irreversible

7. Modification Examples Common to Each Embodiment

Modification Example M (FIGS. 30 to 32)

An example in which a data protection seal is provided with a water vapor barrier layer and an ultraviolet protection layer Modification Example N (FIGS. 33 to 35)

An example in which the document is provided with a water vapor barrier layer and an ultraviolet protection layer Modification Example O (FIGS. 36 to 38)

An example in which a card is provided with a water vapor barrier layer and an ultraviolet protection layer 1. First Embodiment

[Configuration]

A data protection seal 100 according to a first embodiment of the present disclosure will be described. FIG. 1 illustrates a schematic configuration example of the data protection seal 100 according to the present embodiment. The data protection seal 100 is a layer that protects a data layer 210 (to be described later) on which confidential information is recorded as a visible image. The data protection seal 100 includes, for example, a cover layer 110, an adhesive layer 120, and a protective layer 130. The cover layer 110, the adhesive layer 120, and the protective layer 130 are stacked in this order. The adhesive layer 120 and the protective layer 130 are provided at a position opposing the cover layer 110.

The protective layer 130 is a layer that protects the adhesive layer 120 and is peeled off from the adhesive layer 120 when the data protection seal 100 is used. The protective layer 130 is a resin layer having flexibility, and includes, for example, polyethylene terephthalate (PET) or the like. The adhesive layer 120 is a layer for attaching the data protection seal 100 to, for example, a document or the like, and includes, for example, an acrylic pressure-sensitive adhesive or the like.

The cover layer 110 is a layer for hiding confidential information recorded on a document or the like (hereinafter, simply referred to as "confidential information") by being attached to a document or the like. The cover layer 110 is configured to transition between a color-developed state and a decolored state in a visible wavelength region. It is preferable that a color at the time of color development of the cover layer 110 be a black color having an optical density of 1.5 or more. It is to be noted that the optical density of the color at the time of color development of the cover layer 110 may be a density at which it is not possible to visually recognize the visible image of the data layer 210. The visible image of the cover layer 110 may include multiple colors or may include a single color.

When the cover layer 110 being attached to the document or the like is in the color-developed state in the visible wavelength region, the cover layer 110 prevents the confidential information from being visually recognized or being recognized. In a case where the cover layer 110 prevents the confidential information from being visually recognized, a portion of or entire confidential information is caused to be in an invisible state by the cover layer 110. In contrast, in a case where the cover layer 110 prevents the confidential information from being recognized, a portion of or entire confidential information may be in a visible state through the cover layer 110, but the confidential information is caused to appear, due to the cover layer 110, as a visible image that is different from the original visible image of the confidential information.

Further, when the cover layer 110 being attached to the document or the like is in the decolored state in the visible wavelength, the cover layer 110 does not prevents the confidential information from being visually recognized. At this time, the confidential information is in the visible state through the cover layer 110.

The cover layer 110 includes, for example, a leuco dye (reversible heat-sensitive color developing composition) and a photothermal conversion agent for generating heat at a time of writing. The cover layer 110 further includes, for example, a developer and a polymer.

The leuco dye is combined with the developer, thereby turning into the color-developed state in the visible wavelength region, or separates from the developer, thereby turning into the decolored state in the visible wavelength region. When the cover layer 110 reaches its writing temperature by heat, the leuco dye included in the cover layer 110 is combined with the developer and develops a predetermined color in the visible wavelength region. Further, the cover layer 110 is transparent in the decolored state in the visible wavelength region. The photothermal conversion agent absorbs light of the near-infrared region (700 nm to 2500 nm), for example, and generates heat. It is to be noted that, in this description, the near-infrared region refers to a wavelength band of 700 nm to 2500 nm. The photothermal conversion agent included in the cover layer 110 has an absorption peak at a wavelength $\lambda 1$ (700 nm$\leq \lambda 1 \leq$2500 nm), for example.

FIG. 2 illustrates a state in which the data protection seal 100 is attached to a document 200. In FIG. 2, the protective layer 130 has been peeled off from the adhesive layer 120, and the cover layer 110 is attached to the data layer 210 of the document 200 by the adhesive layer 120. The document 200 includes a base layer 220, and the data layer 210 on which the confidential information is recorded as the visible image. The base layer 220 includes an opaque material such as paper, for example. The data layer 210 is, for example, a print layer in which the confidential information is irreversibly fixed on the base layer 220, and includes, for example, a visible image formed by offset printing. It is to be noted that the data layer 210 may be a character or a picture handwritten on the base layer 220. The data layer 210 includes visible images such as numbers, letters, bar codes, two-dimensional codes, photographs, and figures, for example.

FIG. 3 illustrates a schematic configuration example of a drawing device 1 that performs writing and erasing on the cover layer 110 of the data protection seal 100.

The drawing device 1 includes, for example, a communication section 10, an input section 20, a display section 30, a storage 40, an image recognition section 50, a drawing section 60, and an information processing section 70. The drawing device 1 is coupled to a networked through the communication section 10. The network is, for example, a communication line such as LAN or WAN. A terminal device is coupled to the network. The drawing device 1 is configured to be able to communicate with the terminal device via the network. The terminal device is, for example, a portable terminal, and is configured to be able to communicate with the drawing device 1 via the network.

The communication section 10 communicates with an external device such as a terminal device. The communication section 10 outputs, for example, one or a plurality of pieces of input image data received from the external device such as a mobile terminal to the information processing section 70. The information processing section 70 stores the one or the plurality of pieces of input image data inputted from the communication section 10 in the storage 40. The one or the plurality of pieces of input image data is, for example, data in which gradation values of respective drawing coordinates are described.

The input section 20 accepts an input (e.g., an execution instruction) from a user. The input section 20 outputs information inputted by the user to the information processing section 70. The information processing section 70 performs a predetermined process on the basis of information inputted from the input section 20. The display section 30 displays a screen on the basis of the various pieces of screen data created by the information processing section 70. The display section 30 includes, for example, a liquid crystal panel, or an organic EL (Electro Luminescence) panel.

The image recognition section 50 performs measurement in response to a measurement command from the information processing section 70. The image recognition section 50 acquires visible image data of the data layer 210, for example, by measuring a surface of the data layer 210. The visible image data is, for example, data in which the gradation values of the respective drawing coordinates are described. The image recognition section 50 outputs to the information processing section 70 the visible image data obtained by measuring the surface of the data layer 210. The information processing section 70 stores the visible image data inputted from the image recognition section 50 in the storage 40.

The storage 40 stores, for example, a program 41 and image data 42. The program 41 contains a set of steps for performing writing and erasing on the cover layer 110 of the data protection seal 100. The image data 42 is, for example, data describing the gradation values of the respective drawing coordinates, and includes image data to be used when performing writing on the data protection seal 100 and image data to be used when performing erasing on the data protection seal 100. The image data 42 may also be image data to be used in both writing and erasing on the data protection seal 100. The information processing section 70 performs writing or erasing on the cover layer 110 by loading the program 41. The storage 40 stores, for example, the one or the plurality of pieces of input image data inputted from the communication section 10 or the visible image data inputted from the image recognition section 50. The one or the plurality of pieces of input image data or the visible image data may also be used when writing is performed on the cover layer 110.

The information processing section 70 includes, for example, a CPU (Central Processing Unit) and a GPU (Graphics Processing Unit). The information processing section 70, for example, executes the program 41 stored in the storage 40. The execution of the program 41 in the information processing section 70 is described in detail later.

Next, the drawing section 60 will be described. FIG. 4 illustrates a schematic configuration example of the drawing section 60. The drawing section 60 includes, for example, a signal processing circuit 61, a laser driving circuit 62, a light source section 63, an adjustment mechanism 64, a scanner driving circuit 65, and a scanner section 66. The drawing section 60 performs writing or erasing on the cover layer 110 by controlling an output of the light source section 63 on the basis of an output setting value inputted from the information processing section 70. The output setting value is, for example, a command voltage value corresponding to the gradation values of the respective drawing coordinates of the image data 42, the one or the plurality of pieces of input image data, or the visible image data.

The signal processing circuit 61 acquires the output setting value inputted from the information processing section 70 as an image signal Din. The signal processing circuit 61 generates, for example, from the image signal Din, a pixel signal Dout corresponding to a scanner operation of the scanner section 66. The pixel signal Dout causes the light source section 63 to output a laser light beam having power corresponding to the output setting value. The signal processing circuit 61 controls, together with the laser driving circuit 62, a peak value of current pulses to be applied to the light source section 63 (a light source 63A) depending on the signal Dout.

The laser driving circuit 62 drives the light source 63A of the light source section 63 in accordance with the pixel signal Dout, for example. The laser driving circuit 62 controls, for example, luminance (brightness) of a laser light beam for drawing an image corresponding to the pixel signal Dout. The laser driving circuit 62 includes, for example, a driving circuit that drives the light source 63A. The light source 63A performs writing and erasing on the data protection seal 100 by outputting a laser light beam of power corresponding to the output setting value to the data protection seal 100. The light source 63A emits a laser light beam in the near infrared region. The light source 63A is, for example, a laser diode that emits a laser light beam La having a wavelength $\lambda 1$.

The light source section 63 includes, for example, the light source 63A and a lens 63e. The adjustment mechanism 64 is a mechanism for adjusting a focus of the light (the laser light beam La) emitted from the light source section 63. The adjustment mechanism 64 is, for example, a mechanism for adjusting a position of the lens 63e by manual manipulation of a user. It is to be noted that the adjustment mechanism 64 may be a mechanism for adjusting the position of the lens 63e by mechanical manipulation.

The scanner driving circuit 65 drives the scanner section 66, for example, in synchronization with a projection image clock signal inputted from the signal processing circuit 61. Further, in a case where a signal of an irradiation angle of a later-described two-axis scanner 66A or the like is inputted from the from scanner section 66, the scanner driving circuit 65 drives the scanner section 66 to cause the irradiation angle to be a desired irradiation angle on the basis of the signal.

The scanner section 66, for example, raster-scans the surface of the data protection seal 100 with the light (the laser light beam La) outputted from the light source section 63. The scanner section 66 includes, for example, the two-axis scanner 66A and an fθ lens 66B. The two-axis scanner 66A is, for example, a galvanometer mirror. The fθ lens 66B converts a constant velocity scan by the two-axis scanner 66A into a constant velocity linear scan of a spot moving on the focal plane (the surface of the data protection seal 100). It is to be noted that the scanner section 66 may include a one-axis scanner and an fθ lens. In this case, it is preferable that a one-axis stage for displacing the data protection seal 100 in a direction perpendicular to a scanning direction of the one-axis scanner be provided.

Next, an example of performing writing on the data protection seal 100 by the drawing device 1 will be described.

[Writing]

First, the user prepares an uncolored data protection seal 100 and sets it in the drawing section 60. The user then instructs the information processing section 70 to perform writing through the input section 20. The information processing section 70 then converts the image data 42 read from the storage 40 into the output setting value of the drawing section 60 and inputs the output setting value obtained by the conversion into the drawing section 60. The drawing section 60 performs writing on the data protection seal 100 on the basis of the inputted output setting value (see the upper diagram of FIG. 5).

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam. The signal processing circuit 61 outputs the generated light emission signal to the laser driving circuit 62 of the drawing section 60.

The laser driving circuit 62 drives the light source 63A of the light source section 63 in accordance with the light emission signal. At this time, the laser driving circuit 62 causes the laser light beam La to be emitted from the light source 63A and to be scanned on the data protection seal 100, for example. As a result, for example, the laser light beam La having the wavelength $\lambda 1$ is absorbed by the photothermal conversion agent in the cover layer 110, whereby heat generated from the photothermal conversion agent causes the cover layer 110 to reach the writing temperature, and the leuco dye combines with the developer to develop a predetermined color in the visible wavelength region. In this way, the drawing section 60 performs writing on the data protection seal 100.

Next, an example of performing erasing on the data protection seal 100 by the drawing device 1 will be described.

[Erasing]

First, the user prepares the data protection seal 100 on which writing has been performed as described above and sets it in the drawing section 60. The user then instructs the information processing section 70 to perform erasing through the input section 20. Then, the information processing section 70 sets the output setting value such that the temperature of the cover layer 110 on which erasing is to be performed satisfies a temperature condition suitable for decoloring by heat generated by the photothermal conversion agent. The drawing section 60 performs erasing on the data protection seal 100 on the basis of the inputted output setting value (see the lower diagram of FIG. 5).

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63A of the light source section 63 in accordance with the light emission signal. At this time, the laser driving circuit 62 causes the laser light beam La to be emitted from the light source 63A and to be scanned on the data protection seal 100, for example. As a result, for example, the laser light beam La having the wavelength λ1 is absorbed by the photothermal conversion agent in the cover layer 110, whereby heat generated from photothermal conversion agent causes the cover layer 110 to be in a temperature condition suitable for decoloring, and the leuco dye separates from the developer and is decolored. In this way, the drawing section 60 performs erasing on the data protection seal 100.

[Effects]

Next, effects of the data protection seal 100 and the drawing device 1 according to the present embodiment will be described.

In a case where important information such as passwords and cryptographic secret keys is stored for a long period of time and stored on a recording medium connected to a computer, there has been an issue in that the stored information is stolen by a third party or becomes unreadable due to hacking or failure of a device. At present, a method of printing on paper and storing it is considered to be the safest. However, a risk of leakage of information due to illegal viewing by a third party or loss of printing due to deterioration of paper or ink is not zero. For example, a disclosure described in the above PTL 1 is conceivable as a measure for suppressing the illegal viewing of a third party. However, in the disclosure of PTL 1, there is an issue that visualization is not achieved without using an infrared sensor.

In contrast, in the data protection seal 100 according to the present embodiment, it is possible to conceal the confidential information by attaching the data protection seal 100 to the data layer 210, causing the cover layer 110 to develop a color to make the confidential information invisible, or allowing the cover layer 110 to prevent the confidential information from being recognized. In addition, it is possible to visually recognize the confidential information in the visible wavelength region by decoloring the cover layer 110 and visualizing the confidential information. Thus, in the data protection seal 100 according to the present embodiment, it is possible to visualize the confidential information in the visible wavelength region.

In contrast, in the present embodiment, the protective layer 130 that protects the adhesive layer 120 is provided. This makes the data protection seal 100 easier to handle than a case where no protective layer 130 is provided.

Further, in the present embodiment, the cover layer 110 includes the leuco dye, the photothermal conversion agent, the developer, and the polymer. Thus, by applying laser light beams having a light emission wavelength corresponding to an absorption wavelength of the photothermal conversion agent to the cover layer 110, and by heating the photothermal conversion agent, the cover layer 110 reaches the writing temperature, the developer and the leuco dye combines with each other, and it becomes possible to turn the leuco dye into the color-developed state in the visible wavelength region. Consequently, it is possible to conceal the confidential information by causing the cover layer 110 to develop a color to make the data layer 210 invisible, or by preventing, by the cover layer 110, the confidential information from being recognized. In addition, if the cover layer 110 is set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of the cover layer 110 is erased, the cover layer 110 is turned into the decolored state, and the data layer 210 is turned into the visible state, whereby it is possible to visually recognize the confidential information in the visible wavelength region.

Further, in the present embodiment, the data layer 210 is a print layer in which the confidential information is irreversibly fixed on the base layer 220. This allows the confidential information printed on the data layer 210 to be visually recognized in the visible wavelength region by turning the cover layer 110 into the decolored state and turning the data layer 210 into the visible state.

Further, in the drawing device 1 according to the present embodiment, any one of writing or erasing on the cover layer 110 is performed by applying the laser light beam La emitted from the light source section 63 to the cover layer 110. It is possible to make the confidential information on the data layer 210 invisible by performing writing on the cover layer 110 by the drawing device 1, and to conceal the confidential information by preventing, by the cover layer 110, the confidential information from being recognized Further, it is possible to visualize the data layer 210 and visually recognize the confidential information by performing erasing on the cover layer 110 by the drawing device 1. Thus, in the drawing device 1 according to the present embodiment, it is possible to visualize the confidential information in the visible wavelength region.

2. Modification Examples of First Embodiment

Modification examples of the data protection seal 100 according to the above embodiment will be described below.

Modification Example A

In the above embodiment, in a case where the visible image data is acquired by the image recognition section 50, the information processing section 70 may convert processed image data obtained by performing predetermined processing on the visible image data read from the storage 40 into the image data of the cover layer 110. The processed image data is, for example, gray-scale image data having a pattern that differs from a pattern of the visible image data of the data layer 210. For example, inverted image data in which the visible image data is inverted as illustrated in FIG. 6 may be used, or, for example, complicated patterned image data as illustrated in FIG. 7 may be used.

On the cover layer 110, if, for example, the inverted image data in which the visible image data is inverted as illustrated in FIG. 6 is written, the confidential information as a whole is in the visible state through the cover layer 110, but the confidential information is caused to appear, due to the cover layer 110, as a visible image (e.g., a solid image) different from the original visible image of the confidential information. Further, on the cover layer 110, if, for example, the complicated patterned image data as illustrated in FIG. 7 is written, a portion of the confidential information is in the visible state through the cover layer 110, but the confidential information is caused to appear, due to the cover layer 110, as a visible image (e.g., a striped image) different from the original visible image of the confidential information. Therefore, by performing writing on the cover layer 110, it is possible to hide the confidential information by the cover layer 110 as in the above embodiment. In contrast, by performing erasing on the cover layer 110, it is possible to visually recognize the confidential information through the cover layer 110 as in the above embodiment.

Modification Example B

In the above embodiment and the modification example thereof, the cover layer 110 may include, for example, a photochromic material. Examples of the photochromic material include a diarylethene compound and the like. The photochromic material is configured to transition between the color-developed state (colored state) and the decolored state in the visible wavelength region. The photochromic material has an absorption peak in the ultraviolet region in the decolored state, and when ultraviolet rays having wavelengths near the absorption peak being applied, the absorption peak shifts to the visible-light region and turns into the color-developed state. Therefore, it is possible to conceal the confidential information by applying the ultraviolet rays having the wavelengths close to the absorption peak in the decolored state to cause photochromic material to develop a color, thereby making the cover layer 110 invisible, or by preventing, by the cover layer 110, the confidential information from being recognized. In addition, it is possible to visually recognize the confidential information by applying strong visible light close to the absorption-peak wavelength in the color-developed state to decolorize the photochromic material and visualize the cover layer 110. Therefore, also in the data protection seal 100 according to the present modification example, it is possible to visualize the confidential information in the visible wavelength region.

Modification Example C

In the above embodiment and the modification examples thereof, the cover layer 110 may include, for example, a material configured to control an optical transmittance in the visible wavelength region owing to phase change, or a material configured to transition between the color-developed state and the decolored state in the visible wavelength region owing to phase change. As such a material, it is possible to use a phase change material configured to mutually transition between two phases, amorphous and crystalline phases. For example, a film of a germanium-antimony-tellurium-alloy $Ge_2Sb_2Te_5$ becomes a transparent amorphous phase when heated to a high temperature of about 600° C. and quenched, and becomes an opaque crystalline phase when heated to a medium temperature of about 160° C. and slowly cooled. By using such a phase change material for the cover layer 110, the amorphous phase can be the visible state of the confidential information, and the crystalline phase can be the invisible state of the confidential information. It is possible to conceal the confidential information by changing the phase change material into the crystalline phase to make the cover layer 110 opaque, or by preventing, by the cover layer 110, the confidential information from being recognized. In addition, it is possible to visually recognize the confidential information by changing the phase change material into the amorphous phase to make the cover layer 110 transparent. Therefore, also in the data protection seal 100 according to the present modification example, it is possible to visualize the confidential information in the visible wavelength region.

Modification Example D

In the above embodiment and the modification example thereof, the data protection seal 100 may include, in addition to the cover layer 110, one or a plurality of cover layers having a similar function as the cover layer 110. The data protection seal 100 may include, for example, cover layers 110 and 140, as illustrated in FIG. 8. The data protection seal 100 may include a heat-insulating adhesive layer 150 between the cover layer 110 and the cover layer 140. The heat-insulating adhesive layer 150 is a layer of a pressure-sensitive adhesive or an adhesive for attaching the cover layer 140 to the cover layer 110, and is a layer that is able to prevent heat from propagating between the cover layer 110 and the cover layer 140. The heat-insulating adhesive layer 150 includes, for example, a pressure-sensitive adhesive or an adhesive containing a synthetic resin having a thermal conductivity of 0.3 (W/m·K) or less. The thickness of the heat-insulating adhesive layer 150 is desirably 3 μm or more, and more desirably 6 μm or more.

The cover layer 140 is a layer for hiding the confidential information by being attached to a document, etc. The cover layer 140 is configured to transition between the color-developed state and the decolored state in the visible wavelength region. It is preferable that a color at the time of color development of the cover layer 140 be a black color having an optical density of 1.5 or more. It is to be noted that the optical density of the color at the time of color development of the cover layer 140 may be a density at which it is not possible to visually recognize the visible image of the data layer 210. The visible image of the cover layer 140 may include multiple colors or may include a single color. In a case where the visible image of the data layer 210 includes the single color, a color difference ΔE* between the data layer 210 and the cover layer 110 is preferably 1.2 or less.

It is to be noted that the color difference ΔE* between the data layer 210 and the cover layer 110 may be such that the visible image of the data layer 210 is not visually recognizable. Incidentally, the color difference ΔE* is expressed by the following equation, where two colors are respectively expressed by $(L^*_1, a^*_1, b^*_1)$ and $(L^*_2, a^*_2, b^*_2)$ in an L*a*b* color space.

$$\Delta E^* = ((L^*_2 - L^*_1)^2 + (a^*_2 - a^*_1)^2 + (b^*_2 - b^*_1)^2)^{1/2}$$

When the cover layer 140 being attached to the document or the like is in the color-developed state in the visible wavelength region, the cover layer 140 prevents the confidential information from being visually recognized or being recognized. In a case where the cover layer 140 prevents the confidential information from being visually recognized, a portion of or entire confidential information is caused to be in the invisible state by the cover layer 140. In contrast, in a case where the cover layer 140 prevents the confidential information from being recognized, a portion of or entire confidential information may be in the visible state through the cover layer 140, but the confidential information is caused to appear, due to the cover layer 140, as a visible image that is different from the original visible image of the confidential information.

Further, when the cover layer 140 being attached to the document or the like is in the decolored state in the visible wavelength, the cover layer 140 does not prevents the confidential information from being visually recognized. At this time, the confidential information is in the visible state through the cover layer 140.

The cover layer 140 includes, for example, a leuco dye and a photothermal conversion agent for generating heat at a time of writing. The cover layer 140 further includes, for example, a developer and a polymer.

The leuco dye is combined with the developer, thereby turning into the color-developed state in the visible wavelength region, or separates from the developer, thereby turning into the decolored state in the visible wavelength region. When the cover layer 140 reaches its writing temperature by heat, the leuco dye included in the cover layer 140 is combined with the developer and develops a predetermined color in the visible wavelength region. Further, the cover layer 140 is transparent in the decolored state in the visible wavelength region. The photothermal conversion agent absorbs light of the near-infrared region (700 nm to 2500 nm), for example, and generates heat. The photothermal conversion agent included in the cover layer 140 has an absorption peak at a wavelength $\lambda 2$ ($\lambda 2 \neq \lambda 1$, 700 nm$\leq \lambda 2 \leq$2500 nm), for example. In the present modification example, in a case where the cover layer 110 is disposed at a position closer to the protective layer 130 than the cover layer 140, it is preferable that the wavelength 2J of the absorption peak of the photothermal conversion agent included in the cover layer 110 be longer than the wavelength $\lambda 2$ of the absorption peak of the photothermal conversion agent included in the cover layer 140. This is for making it difficult, for example, for the laser light beam having the wavelength $\lambda 1$ to be absorbed by the cover layer 140 when writing or erasing is performed on the cover layer 110 via the cover layer 140 by using the drawing device 1 including the drawing section 60 of FIG. 9, which will be described later.

Next, the drawing section 60 that performs writing and erasing on the data protection seal 100 including the cover layers 110 and 140 as illustrated in FIG. 8 will be described. FIG. 9 illustrates a schematic configuration example of the drawing section 60 that performs writing and erasing on the data protection seal 100 illustrated in FIG. 8. The drawing section 60 includes, for example, the signal processing circuit 61, the laser driving circuit 62, the light source section 63, the adjustment mechanism 64, the scanner driving circuit 65, and the scanner section 66. The drawing section 60 performs drawing on the data protection seal 100 by controlling an output of the light source section 63 on the basis of an output setting value inputted from the information processing section 70.

The signal processing circuit 61 acquires the output setting value inputted from the information processing section 70 as an image signal Din. The signal processing circuit 61 generates, for example, from the image signal Din, a pixel signal Dout corresponding to a scanner operation of the scanner section 66. The pixel signal Dout causes the light source section 63 (e.g., light sources 63A and 63B to be described later) to output a laser light beam having power corresponding to the output setting value. The signal processing circuit 61 controls, together with the laser driving circuit 62, a peak value of current pulses to be applied to the light source section 63 (e.g., the light sources 63A and 63B) depending on the signal Dout.

The laser driving circuit 62 drives each of the light sources 63A and 63B of the light source section 63 in accordance with the pixel signal Dout, for example. The laser driving circuit 62 controls, for example, luminance (brightness) of a laser light beam for drawing an image corresponding to the pixel signal Dout. The laser driving circuit 62 includes, for example, a driving circuit 62A that drives the light source 63A and a driving circuit 62B that drives the light source 63B. The light sources 63A and 63B each perform writing and erasing on the data protection seal 100 by outputting a laser light beam of power corresponding to the output setting value to the data protection seal 100. The light sources 63A and 63B each emit a laser light beam in the near infrared region. The light source 63A is, for example, a laser diode that emits a laser light beam La having a wavelength $\lambda 1$. The light source 63B is, for example, a laser diode that emits a laser light beam Lb having a wavelength $\lambda 2$.

The light source section 63 has a plurality of light sources differing in light emission wavelengths in the near infrared region. The light source section 63 includes, for example, two light sources 63A and 63B. The light source section 63 further includes, for example, an optical system that multiplexes laser light beams emitted from a plurality of light sources (e.g., the two light sources 63A and 63B). The light source section 63 includes, for example, a reflection mirror 63a, a dichroic mirror 63b, and a lens 63e, as such an optical system.

For example, each of the laser light beams La and Lb emitted from the two light sources 63A and 63B is converted into substantially parallel light (collimated light) by a collimating lens. Thereafter, for example, the laser light beam La is reflected by the reflection mirror 63a and further reflected by the dichroic mirror 63b, and the laser light beam Lb passes through the dichroic mirror 63b, and thus the laser light beam La and the laser light beam Lb are multiplexed together. Multiplexed light Lm of the laser light beam La and the laser light beam La is transmitted through a dichroic mirror 63c. The light source section 63, for example, outputs the multiplexed light Lm obtained by the multiplexing by the optical system to the scanner section 66.

The adjustment mechanism 64 is a mechanism for adjusting a focus of the multiplexed light Lm emitted from the light source section 63. The adjustment mechanism 64 is, for example, a mechanism for adjusting a position of the lens 63e by manual manipulation of a user. It is to be noted that the adjustment mechanism 64 may be a mechanism for adjusting the position of the lens 63e by mechanical manipulation.

The scanner driving circuit 65 drives the scanner section 66, for example, in synchronization with a projection image clock signal inputted from the signal processing circuit 61. Further, in a case where a signal of an irradiation angle of the two-axis scanner 66A or the like is inputted from the from scanner section 66, the scanner driving circuit 65 drives the scanner section 66 to cause the irradiation angle to be a desired irradiation angle on the basis of the signal.

The scanner section 66, for example, raster-scans the surface of the data protection seal 100 with the multiplexed light Lm outputted from the light source section 63. The scanner section 66 includes, for example, the two-axis scanner 66A and the fθ lens 66B. The two-axis scanner 66A is, for example, a galvanometer mirror. The fθ lens 66B converts a constant velocity scan by the two-axis scanner 66A into a constant velocity linear scan of a spot moving on the focal plane (the surface of the data protection seal 100). It is to be noted that the scanner section 66 may include the one-axis scanner and the fθ lens. In this case, it is preferable that a one-axis stage for displacing the data protection seal 100 in a direction perpendicular to a scanning direction of the one-axis scanner be provided.

Next, an example of performing writing on the data protection seal 100 by the drawing device 1 will be described.

[Writing]

First, the user prepares an uncolored data protection seal 100 and sets it in the drawing section 60. The user then instructs the information processing section 70 to perform writing through the input section 20. The information processing section 70 then converts the image data 42 read from the storage 40 into the output setting value of the drawing section 60 and inputs the output setting value obtained by the conversion to the drawing section 60. The drawing section 60 performs writing on the cover layers 110 and 140 of the data protection seal 100 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam. The signal processing circuit 61 outputs the generated light emission signal to the laser driving circuit 62 of the drawing section 60.

The laser driving circuit 62 drives the light sources 63A and 63B of the light source section 63 in accordance with the light emission signal. At this time, the laser driving circuit 62 causes the laser light beam La to be emitted from the light source 63A, causes the laser light beam Lb to be emitted from the light source 63B, and causes synthesized light Lm to be scanned on the data protection seal 100, for example. As a result, the laser light beam La having the wavelength λ1 included in the synthesized light Lm is absorbed by the photothermal conversion agent in the cover layer 110, whereby heat generated from the photothermal conversion agent causes the cover layer 110 to reach the writing temperature, and the leuco dye combines with the developer to develop a predetermined color in the visible wavelength region (the upper diagram of FIG. 10). Further, the laser light beam Lb having the wavelength λ2 included in the synthesized light Lm is absorbed by the photothermal conversion agent in the cover layer 140, whereby heat generated from the photothermal conversion agent causes the cover layer 140 to reach the writing temperature, and the leuco dye combines with the developer to develop a predetermined color in the visible wavelength region (the lower diagram of FIG. 10). In this way, the drawing section 60 performs writing on the data protection seal 100 illustrated in FIG. 8.

Next, an example of performing erasing on the data protection seal 100 by the drawing device 1 will be described.

[Erasing]

First, the user prepares the data protection seal 100 on which writing has been performed as described above and sets it in the drawing section 60. The user then instructs the information processing section 70 to perform erasing through the input section 20. Then, the information processing section 70 sets the output setting value such that the temperature of the cover layers 110 and 140 on which erasing is to be performed satisfies a temperature condition suitable for decoloring by heat generated by the photothermal conversion agent. The drawing section 60 performs erasing on the data protection seal 100 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light sources 63A and 63B of the light source section 63 in accordance with the light emission signal. At this time, the laser driving circuit 62 causes the laser light beam La to be emitted from the light source 63A, causes the laser light beam Lb to be emitted from the light source 63B, and causes synthesized light Lm to be scanned on the data protection seal 100, for example. As a result, the laser light beam La having the wavelength λ1 included in the synthesized light Lm is absorbed by the photothermal conversion agent in the cover layer 110, whereby heat generated from the photothermal conversion agent causes the cover layer 110 to be in a temperature condition suitable for decoloring, and the leuco dye separates from the developer and is decolored (the upper diagram of FIG. 11). Further, the laser light beam Lb having the wavelength λ2 included in the synthesized light Lm is absorbed by the photothermal conversion agent in the cover layer 140, whereby heat generated from the photothermal conversion agent causes the cover layer 140 to be in a temperature condition suitable for decoloring, and the leuco dye separates from the developer and is decolored (the lower diagram of FIG. 11). In this way, the drawing section 60 performs erasing on the data protection seal 100.

[Effects]

Next, effects of the data protection seal 100 and the drawing device 1 according to the present modification example will be described.

In the data protection seal 100 according to the present modification example, it is possible to conceal the confidential information by attaching the data protection seal 100 to the data layer 210, causing the cover layers 110 and 140 to develop a color to make the confidential information invisible, or allowing the cover layers 110 and 140 to prevent the confidential information from being recognized. In addition, it is possible to visually recognize the confidential information in the visible wavelength region by decoloring the cover layers 110 and 140 and visualizing the confidential information. Thus, in the data protection seal 100 according to the present modification example, it is possible to visualize the confidential information in the visible wavelength region.

Further, in the present modification example, the cover layers 110 and 140 each include the leuco dye, the photothermal conversion agent, the developer, and the polymer. Thus, by applying laser light beams having a light emission wavelength corresponding to an absorption wavelength of the photothermal conversion agent to the cover layers 110 and 140, and by heating the photothermal conversion agent, the cover layers 110 and 140 each reach the writing temperature, the developer and the leuco dye combines with each other, and it becomes possible to turn the leuco dye into the color-developed state in the visible wavelength region. Consequently, it is possible to conceal the confidential information by causing each of the cover layers 110 and 140 to develop a color to make the data layer 210 invisible, or by preventing, by the cover layers 110 and 140, the confidential information from being recognized. In addition, if the cover layers 110 and 140 are each set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of each of the cover layers 110 and 140 is erased, the cover layers 110 and 140 are each turned into the decolored state, and the data layer 210 is turned into the visible state, whereby it is possible to visually recognize the confidential information in the visible wavelength region.

Further, in the drawing device 1 according to the present modification example, any one of writing or erasing on the cover layers 110 and 140 is performed by applying the synthesized light Lm emitted from the light source section 63 to the cover layer 110. It is possible to make the confidential information on the data layer 210 invisible by performing writing on the cover layers 110 and 140 by the drawing device 1 according to the present modification example, and to conceal the confidential information by preventing, by the cover layers 110 and 140, the confidential information from being recognized Further, it is possible to visualize the data layer 210 and visually recognize the confidential information by performing erasing on the cover layers 110 and 140 by the drawing device 1. Thus, in the drawing device 1 according to the present modification example, it is possible to visualize the confidential information in the visible wavelength region.

In the present modification example, since the heat-insulating adhesive layer 150 is provided between the cover layer 110 and the cover layer 140, the heat-insulating adhesive layer 150 prevents heat propagation between the cover layer 110 and the cover layer 140. Thus, for example, when color development or decoloring is performed on the cover layer 110, it is possible to prevent the color development or decoloring from being erroneously performed on the cover layer 140.

Modification Example E

In the above embodiment and modification examples thereof, for example, as illustrated in FIG. 12, a reversible data layer 230 may be provided instead of the data layer 210 in the document 200. The reversible data layer 230 is configured to record confidential information as a visible image and includes, for example, a reversible material configured to transition between the color-developed state and the decolored state in the visible wavelength region. The reversible data layer 230 records the confidential information as the visible image. The confidential information is recorded, owing to the color development of the reversible material, on the reversible data layer 230 as the visible image. At this time, the optical density of the color at the time of color development of the cover layer 110 may be a density at which it is not possible to visually recognize the visible image of the reversible data layer 230. The visible image of the cover layer 110 may include multiple colors or may include a single color. In a case where the visible image of the reversible data layer 230 includes the single color, a color difference $\Delta E^*$ between the reversible data layer 230 and the cover layer 110 is preferably 1.2 or less. It is to be noted that the color difference $\Delta E^*$ between the data layer 210 and cover layer 110 may be such that the visible image of the data layer 210 is not visually recognizable.

The reversible data layer 230 includes, for example, a leuco dye and a photothermal conversion agent for generating heat at a time of writing. The reversible data layer 230 further includes, for example, a developer and a polymer.

The leuco dye is combined with the developer, thereby turning into the color-developed state in the visible wavelength region, or separates from the developer, thereby turning into the decolored state in the visible wavelength region. When the reversible data layer 230 reaches its writing temperature by heat, the leuco dye included in the reversible data layer 230 is combined with the developer and develops a predetermined color in the visible wavelength region. Further, the reversible data layer 230 is transparent in the decolored state in the visible wavelength region. The photothermal conversion agent absorbs light of the near-infrared region (700 nm to 2500 nm), for example, and generates heat. The photothermal conversion agent included in the reversible data layer 230 has an absorption peak at the wavelength $\lambda 2$, for example. In other words, the cover layer 110 includes a reversible material whose transition condition differs from the transition condition of the reversible data layer 230. The cover layer 110 is color-developed or decolored in a case where a laser light beam having the wavelength $\lambda 1$ is applied, and the reversible data layer 230 is color-developed or decolored in a case where a laser light beam having the wavelength $\lambda 2$ is applied. In the present modification example, in a case where the reversible data layer 230 is disposed below the cover layer 110, the wavelength $\lambda 2$ of the absorption peak of the photothermal conversion agent included in the reversible data layer 230 is preferably longer than the wavelength $\lambda 1$ of the absorption peak of the photothermal conversion agent included in the cover layer 110. In other words, it is preferable that the wavelength $\lambda 1$ of the absorption peak of the photothermal conversion agent included in the cover layer 110 be shorter than the wavelength $\lambda 2$ of the absorption peak of the photothermal conversion agent included in the reversible data layer 230. This is for making it difficult, for example, for the laser light beam having the wavelength $\lambda 2$ to be absorbed by the cover layer 110 when writing or erasing is performed on the reversible data layer 230 via the cover layer 110 by using the drawing device 1 including the drawing section 60 of FIG. 9.

In the present modification example, it is preferable that the adhesive layer 120 be a layer for attaching the cover layer 110 to the reversible data layer 230, and be a heat-insulating adhesive layer that prevents heat from propagating between the cover layer 110 and the reversible data layer 230. In this case, the adhesive layer 120 includes, for example, a pressure-sensitive adhesive or an adhesive containing a synthetic resin having a thermal conductivity of 0.3 (W/m·K) or less. The thickness of the heat-insulating adhesive layer 150 is desirably 3 µm or more, and more desirably 6 µm or more.

Next, an example of performing writing on the reversible data layer 230 and the data protection seal 100 by the drawing device 1 will be described.

[Writing]

First, the user prepares the reversible data layer 230 and the data protection seal 100 that are uncolored and sets them in the drawing section 60. The user then instructs the information processing section 70 to perform writing through the input section 20. The information processing section 70 then converts two pieces of image data read from the storage 40 into output setting values of the drawing section 60 and inputs the two output setting values obtained by the conversion into the drawing section 60. The drawing section 60 performs writing on the reversible data layer 230 and the data protection seal 100 on the basis of the inputted two output setting values.

The signal processing circuit 61 of the drawing section 60 acquires the two output setting values inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam. The signal processing circuit 61 outputs the generated light emission signal to the laser driving circuit 62 of the drawing section 60.

The driving circuit 62A drives the light source 63A of the light source section 63 in accordance with a light emission signal generated from one of the output setting values. The driving circuit 62B drives the light source 63B of the light source section 63 in accordance with a light emission signal generated from the other output setting value. At this time, the driving circuit 62A causes the laser light beam La to be emitted from the light source 63A, the driving circuit 62B causes the laser light beam Lb to be emitted from the light source 63B, and the synthesized light Lm is scanned on the data protection seal 100. As a result, the laser light beam La having the wavelength λ1 included in the synthesized light Lm is absorbed by the photothermal conversion agent in the cover layer 110, whereby heat generated from the photothermal conversion agent causes the cover layer 110 to reach the writing temperature, and the leuco dye combines with the developer to develop a predetermined color in the visible wavelength region (the lower diagram of FIG. 13). Further, the laser light beam Lb having the wavelength λ2 included in the synthesized light Lm is absorbed by the photothermal conversion agent in the reversible data layer 230, whereby heat generated from the photothermal conversion agent causes the reversible data layer 230 to reach the writing temperature, and the leuco dye combines with the developer to develop a predetermined color in the visible wavelength region (the upper diagram of FIG. 13). In this way, the drawing section 60 performs writing on the reversible data layer 230 and the data protection seal 100 illustrated in FIG. 12.

Next, an example of performing erasing on the reversible data layer 230 and the data protection seal 100 by the drawing device 1 will be described.

[Erasing]

First, the user prepares the reversible data layer 230 and the data protection seal 100 on which writing has been performed as described above and sets them in the drawing section 60. The user then instructs the information processing section 70 to perform erasing on the data protection seal 100 through the input section 20. Then, the information processing section 70 sets the output setting value such that the temperature of the cover layer 110 on which erasing is to be performed satisfies a temperature condition suitable for decoloring by heat generated by the photothermal conversion agent. The drawing section 60 performs erasing on the data protection seal 100 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63A of the light source section 63 in accordance with the light emission signal. At this time, the laser driving circuit 62 causes the laser light beam La to be emitted from the light source 63A and causes the laser light beam La to scan on the data protection seal 100, for example. As a result, for example, the laser light beam La is absorbed by the photothermal conversion agent in the cover layer 110, whereby heat generated from photothermal conversion agent causes the cover layer 110 to be in a temperature condition suitable for decoloring, and the leuco dye separates from the developer and is decolored (the upper diagram of FIG. 14). In this way, the drawing section 60 performs erasing on the data protection seal 100.

It is to be noted that, at this time, the user may further the instruct information processing section 70 to perform erasing on the reversible data layer 230 through the input section 20. In this case, the information processing section 70 converts the image data 42 read from the storage 40 into the output setting value of the drawing section 60 and inputs the output setting value obtained by the conversion to the drawing section 60. At this time, the information processing section 70 sets the output setting value such that the temperature of the reversible data layer 230 on which erasing is to be performed satisfies a temperature condition suitable for decoloring by heat generated by the photothermal conversion agent. The drawing section 60 performs erasing on the reversible data layer 230 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63B of the light source section 63 in accordance with the light emission signal. At this time, the laser driving circuit 62 causes the laser light beam Lb to be emitted from the light source 63B and causes the laser light beam Lb to scan on the data protection seal 100, for example. As a result, for example, the laser light beam Lb is absorbed by the photothermal conversion agent in the reversible data layer 230, whereby heat generated from photothermal conversion agent causes the reversible data layer 230 to be in a temperature condition suitable for decoloring, and the leuco dye separates from the developer and is decolored (the lower diagram of FIG. 14). In this way, the drawing section 60 performs erasing on the reversible data layer 230.

[Effects]

Next, effects of the data protection seal 100 and the drawing device 1 according to the present modification example will be described.

In the data protection seal 100 according to the present modification example, it is possible to conceal the confidential information by attaching the data protection seal 100 to the reversible data layer 230, causing the cover layer 110 to develop a color to make the confidential information invisible, or allowing the cover layer 110 to prevent the confidential information from being recognized. In addition, it is possible to visually recognize the confidential information in the visible wavelength region by decoloring the cover layer 110 and visualizing the confidential information. Thus, in the data protection seal 100 according to the present modification example, it is possible to visualize the confidential information in the visible wavelength region.

Further, in the present modification example, the cover layer 110 includes the leuco dye, the photothermal conversion agent, the developer, and the polymer. Thus, by applying laser light beams having a light emission wavelength corresponding to an absorption wavelength of the photothermal conversion agent to the cover layer 110, and by heating the photothermal conversion agent, the cover layer 110 reaches the writing temperature, the developer and the leuco dye combines with each other, and it becomes possible to turn the leuco dye into the color-developed state in the visible wavelength region. Consequently, it is possible to conceal the confidential information by causing the cover layer 110 to develop a color to make the reversible data layer 230 invisible, or by preventing, by the cover layer 110, the confidential information from being recognized. In addition, if the cover layer 110 is set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of the cover layer 110 is erased, the cover layer 110 is turned into the decolored state, and the reversible data layer 230 is turned into the visible state, whereby it is possible to visually recognize the confidential information in the visible wavelength region. In addition, since the laser light beam of a particular wavelength is necessary for the erasing process on the cover layer 110, it is possible to achieve the data protection seal 100 having a higher security level as compared with the case where the visualization is performed simply by increasing the temperature. That is, in a case of attempting to steal the confidential information by a method other than the normal method, for example, attempting to heat the entire data protection seal 100 to turn the cover layer 110 into the decolored state, the confidential information written in the reversible data layer 230 is also decolored at the same time, so that there is no risk that the confidential information may be stolen.

In the present modification example, the reversible data layer 230, similarly to the cover layer 110, includes a reversible material configured to transition between the color-developed state and the decolored state in the visible wavelength region. However, the reversible data layer 230 includes the reversible material whose transition condition differs from the transition condition of the cover layer 110. In other words, the cover layer 110 includes the reversible material whose transition condition differs from the transition condition of the reversible data layer 230. As a result, the drawing device 1 is able to perform the transition between color development and decoloring on only one of the reversible data layer 230 or the cover layer 110. Consequently, the drawing device 1 is able to control visualization and invisualization of the confidential information by only causing the transition between color development and decoloring of the cover layer 110 to be performed. Further, the drawing device 1 is also able to perform rewriting on the reversible data layer 230.

Further, in the present modification example, in a case where the adhesive layer 120 is the heat-insulating adhesive layer described above, the adhesive layer 120 prevents heat propagation between the cover layer 110 and the reversible data layer 230. Thus, for example, when color development or decoloring is performed on the cover layer 110, it is possible to prevent the color development or decoloring from being erroneously performed on the reversible data layer 230.

Further, in the present modification example, the protective layer 130 that protects the adhesive layer 120 is provided. This makes the data protection seal 100 easier to handle than a case where no protective layer 130 is provided.

3. Second Embodiment

[Configuration]

A document 300 according to a second embodiment of the present disclosure will be described. FIG. 15 illustrates a schematic configuration example of the document 300 according to the present embodiment. The document 300 includes, for example: a base layer 310; and a reversible data layer 320, a heat-insulating adhesive layer 330, and a cover layer 340 that are formed over the base layer 310. The reversible data layer 320, the heat-insulating adhesive layer 330, and the cover layer 340 are stacked in this order over the base layer 310. Positions of the reversible data layer 320 and the cover layer 340 may be exchanged. The heat-insulating adhesive layer 330 and the cover layer 340 are provided at positions opposed to the reversible data layer 320. The cover layer 340 is disposed above the reversible data layer 320.

The base layer 310 includes an opaque material such as paper or a synthetic resin, for example. The heat-insulating adhesive layer 330 is a layer for attaching the cover layer 340 to the reversible data layer 320, and is a layer that is able to prevent heat from propagating between the cover layer 340 and the reversible data layer 320. The heat-insulating adhesive layer 330 includes, for example, a pressure-sensitive adhesive or an adhesive containing a synthetic resin having a thermal conductivity of 0.3 (W/m·K) or less. The thickness of the heat-insulating adhesive layer 330 is desirably 3 μm or more, and more desirably 6 μm or more.

The reversible data layer 320 and the cover layer 340 are each configured to transition between the color-developed state and the decolored state in the visible wavelength region. The cover layer 340 includes a reversible material whose transition condition differs from a transition condition of the reversible data layer 320. In other words, the reversible data layer 320 includes the reversible material whose transition condition differs from the transition condition of the cover layer 340. At this time, an optical density of a color at a time of color development of the cover layer 340 may be a density at which it is not possible to visually recognize a visible image of the reversible data layer 320. A visible image of the cover layer 340 may include multiple colors or may include a single color. In a case where the visible image of the reversible data layer 320, a color difference ΔE* between the reversible data layer 320 and the cover layer 340 is preferably 1.2 or less. It is to be noted that the color difference ΔE* between the reversible data layer 320 and the cover layer 340 may be such that the visible image of the reversible data layer 320 is not visually recognizable.

The cover layer 340 is a layer for hiding confidential information written on the reversible data layer 320. When the cover layer 340 is in the color-developed state in the visible wavelength region, the cover layer 340 prevents the confidential information from being visually recognized or being recognized. In a case where the cover layer 340 prevents the confidential information from being visually recognized, a portion of or entire confidential information is caused to be in the invisible state by the cover layer 340. In contrast, in a case where the cover layer 340 prevents the confidential information from being recognized, a portion of or entire confidential information may be in the visible state through the cover layer 340, but the confidential information is caused to appear, due to the cover layer 340, as a visible image that is different from the original visible image of the confidential information.

Further, when the cover layer 340 is in the decolored state in the visible wavelength, the cover layer 340 does not prevents the confidential information from being visually recognized. At this time, the confidential information is in the visible state through the cover layer 340.

The reversible data layer 320 includes, for example, a leuco dye and a photothermal conversion agent for generating heat at a time of writing. The reversible data layer 320 further includes, for example, a developer and a polymer.

The leuco dye is combined with the developer, thereby turning into the color-developed state in the visible wavelength region, or separates from the developer, thereby turning into the decolored state in the visible wavelength region. When the reversible data layer 320 reaches its writing temperature by heat, the leuco dye included in the reversible data layer 320 is combined with the developer and develops a predetermined color in the visible wavelength region. Further, the reversible data layer 320 is transparent in the decolored state in the visible wavelength region. The photothermal conversion agent absorbs light of the near-infrared region (700 nm to 2500 nm), for example, and generates heat. The photothermal conversion agent included in the reversible data layer 320 has an absorption peak at the wavelength $\lambda 1$, for example.

The cover layer 340 includes, for example, a leuco dye and a photothermal conversion agent for generating heat at a time of writing. The cover layer 340 further includes, for example, a developer and a polymer.

The leuco dye is combined with the developer, thereby turning into the color-developed state in the visible wavelength region, or separates from the developer, thereby turning into the decolored state in the visible wavelength region. When the cover layer 340 reaches its writing temperature by heat, the leuco dye included in the cover layer 340 is combined with the developer and develops a predetermined color in the visible wavelength region. Further, the cover layer 340 is transparent in the decolored state in the visible wavelength region. The photothermal conversion agent absorbs light of the near-infrared region (700 nm to 2500 nm), for example, and generates heat. The photothermal conversion agent included in the cover layer 340 has an absorption peak at the wavelength $\lambda 2$ (700 nm$\leq\lambda 2\leq$2500 nm), for example. In the present embodiment, in a case where the reversible data layer 320 is disposed below the cover layer 340, the wavelength $\lambda 1$ of the absorption peak of the photothermal conversion agent included in the reversible data layer 320 is preferably longer than the wavelength $\lambda 2$ of the absorption peak of the photothermal conversion agent included in the cover layer 340. This is for making it difficult, for example, for the laser light beam having the wavelength $\lambda 1$ to be absorbed by the cover layer 340 when writing or erasing is performed on the reversible data layer 320 via the cover layer 340 by using the drawing device 1 including the drawing section 60 of FIG. 9. Further, in the present embodiment, in a case where the cover layer 340 is disposed below the reversible data layer 320, the wavelength $\lambda 2$ of the absorption peak of the photothermal conversion agent included in the cover layer 340 is preferably longer than the wavelength $\lambda 1$ of the absorption peak of the photothermal conversion agent included in the reversible data layer 320. This is for making it difficult, for example, for the laser light beam having the wavelength $\lambda 2$ to be absorbed by the reversible data layer 320 when writing or erasing is performed on the cover layer 340 via the reversible data layer 320 by using the drawing device 1 including the drawing section 60 of FIG. 9.

Next, an example of performing writing on the reversible data layer 320 and the cover layer 340 by the drawing device 1 illustrated in FIG. 9 will be described.

[Writing]

First, the user prepares the reversible data layer 320 and the cover layer 340 that are uncolored and sets them in the drawing section 60. The user then instructs the information processing section 70 to perform writing through the input section 20. The information processing section 70 then converts two pieces of image data read from the storage 40 into output setting values of the drawing section 60 and inputs the two output setting values obtained by the conversion into the drawing section 60. The drawing section 60 performs writing on the reversible data layer 320 and the cover layer 340 on the basis of the inputted two output setting values.

The signal processing circuit 61 of the drawing section 60 acquires the two output setting values inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam. The signal processing circuit 61 outputs the generated light emission signal to the laser driving circuit 62 of the drawing section 60.

The driving circuit 62A drives the light source 63A of the light source section 63 in accordance with a light emission signal generated from one of the output setting values. The driving circuit 62B drives the light source 63B of the light source section 63 in accordance with a light emission signal generated from the other output setting value. At this time, the driving circuit 62A causes the laser light beam La to be emitted from the light source 63A, the driving circuit 62B causes the laser light beam Lb to be emitted from the light source 63B, and the synthesized light Lm is scanned on the document 300. As a result, the laser light beam La having the wavelength $\lambda 1$ included in the synthesized light Lm is absorbed by the photothermal conversion agent in the reversible data layer 320, whereby heat generated from the photothermal conversion agent causes the reversible data layer 320 to reach the writing temperature, and the leuco dye combines with the developer to develop a predetermined color in the visible wavelength region (the upper diagram of FIG. 16). Further, the laser light beam Lb having the wavelength $\lambda 2$ included in the synthesized light Lm is absorbed by the photothermal conversion agent in the cover layer 340, whereby heat generated from the photothermal conversion agent causes cover layer 340 to reach the writing temperature, and the leuco dye combines with the developer to develop a predetermined color in the visible wavelength region (the lower diagram of FIG. 16). That is, the light source 63B emits a laser light beam having a condition in which the reaction of color development and decoloring of the reversible material in the reversible data layer 320 does not occur and in which the reaction of color development of the reversible material in the cover layer 340 occurs. In this way, the light source 63A performs writing on the reversible data layer 320 illustrated in FIG. 15, and the light source 63B performs writing on the cover layer 340 illustrated in FIG. 15.

Next, an example of performing erasing on the cover layer 340 by the drawing device 1 illustrated in FIG. 9 will be described.

[Erasing]

First, the user prepares the reversible data layer 320 and the cover layer 340 on which writing has been performed as described above and sets them in the drawing section 60. The user then instructs the information processing section 70 to perform erasing on the cover layer 340 through the input section 20. Then, the information processing section 70 sets the output setting value such that the temperature of the cover layer 340 on which erasing is to be performed satisfies a temperature condition suitable for decoloring by heat generated by the photothermal conversion agent. The drawing section 60 performs erasing on the cover layer 340 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63A of the light source section 63 in accordance with the light emission signal. At this time, the laser driving circuit 62 causes the laser light beam La to be emitted from the light source 63A and causes the laser light beam La to scan on the document 300, for example. As a result, for example, the laser light beam La is absorbed by the photothermal conversion agent in the cover layer 340, whereby heat generated from photothermal conversion agent causes the cover layer 340 to be in a temperature condition suitable for decoloring, and the leuco dye separates from the developer and is decolored (the upper diagram of FIG. 17). That is, the light source 63B emits a laser light beam having a condition in which the reaction of color development and decoloring of the reversible material in the reversible data layer 320 does not occur and in which the reaction of decoloring of the reversible material in the cover layer 340 occurs. In this way, the light source 63A performs erasing on the reversible data layer 320 illustrated in FIG. 15, and the light source 63B performs erasing on the cover layer 340 illustrated in FIG. 15.

It is to be noted that, at this time, the user may further the instruct information processing section 70 to perform erasing on the reversible data layer 320 through the input section 20. In this case, the information processing section 70 converts the image data 42 read from the storage 40 into the output setting value of the drawing section 60 and inputs the output setting value obtained by the conversion to the drawing section 60. At this time, the information processing section 70 sets the output setting value such that the temperature of the reversible data layer 320 on which erasing is to be performed satisfies a temperature condition suitable for decoloring by heat generated by the photothermal conversion agent. The drawing section 60 performs erasing on the reversible data layer 320 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63B of the light source section 63 in accordance with the light emission signal. At this time, the laser driving circuit 62 causes the laser light beam Lb to be emitted from the light source 63B and causes the laser light beam Lb to scan on the document 300, for example. As a result, for example, the laser light beam Lb is absorbed by the photothermal conversion agent in the reversible data layer 320, whereby heat generated from photothermal conversion agent causes the reversible data layer 320 to be in a temperature condition suitable for decoloring, and the leuco dye separates from the developer and is decolored (the lower diagram of FIG. 17). In this way, the drawing section 60 performs erasing on the reversible data layer 320.

[Effects]

Next, effects of the document 300 and the drawing device 1 according to the present embodiment will be described.

In the document 300 according to the present modification example, it is possible to cause the cover layer 340 to develop a color to make the confidential information invisible, or allowing the cover layer 340 to prevent the confidential information from being recognized. In addition, it is possible to visually recognize the confidential information in the visible wavelength region by decoloring the cover layer 340 and visualizing the confidential information. Thus, in the document 300 according to the present modification example, it is possible to visualize the confidential information in the visible wavelength region.

Further, in the present embodiment, the cover layer 340 includes the leuco dye, the photothermal conversion agent, the developer, and the polymer. Thus, by applying laser light beams having a light emission wavelength corresponding to an absorption wavelength of the photothermal conversion agent to the cover layer 340, and by heating the photothermal conversion agent, the cover layer 340 reaches the writing temperature, the developer and the leuco dye combines with each other, and it becomes possible to turn the leuco dye into the color-developed state in the visible wavelength region. Consequently, it is possible to conceal the confidential information by causing the cover layer 340 to develop a color to make the reversible data layer 320 invisible, or by preventing, by the cover layer 340, the confidential information from being recognized. In addition, if the cover layer 340 is set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of the cover layer 340 is erased, the cover layer 340 is turned into the decolored state, and the reversible data layer 320 is turned into the visible state, whereby it is possible to visually recognize the confidential information in the visible wavelength region. In addition, since the laser light beam of a particular wavelength is necessary for the erasing process on the cover layer 340, it is possible to achieve the document 300 having a higher security level as compared with the case where the visualization is performed simply by increasing the temperature. That is, in a case of attempting to steal the confidential information by a method other than the normal method, for example, attempting to heat the entire document 300 to turn the cover layer 340 into the decolored state, the confidential information written in the reversible data layer 320 is also decolored at the same time, so that there is no risk that the confidential information may be stolen.

In the present embodiment, the reversible data layer 320, similarly to the cover layer 340, includes a reversible material configured to transition between the color-developed state and the decolored state in the visible wavelength region. However, the reversible data layer 320 includes the reversible material whose transition condition differs from the transition condition of the cover layer 340. In other words, the cover layer 340 includes the reversible material whose transition condition differs from the transition condition of the reversible data layer 320. As a result, the drawing device 1 is able to perform the transition between color development and decoloring on only one of the reversible data layer 320 or the cover layer 340. Consequently, the drawing device 1 is able to control visualization and invisualization of the confidential information by only causing the transition between color development and decoloring of the cover layer 340 to be performed. Further, the drawing device 1 is also able to perform rewriting on the reversible data layer 320.

Further, in the present embodiment, the heat-insulating adhesive layer 330 is provided between the cover layer 340 and the reversible data layer 320; therefore, the heat-insulating adhesive layer 330 prevents heat propagation between the cover layer 340 and the reversible data layer 320. Thus, for example, when color development or decoloring is performed on the cover layer 340, it is possible to prevent the color development or decoloring from being erroneously performed on the reversible data layer 320.

Further, in the present embodiment, the base layer 310 includes paper. This makes it possible to achieve the document 300 having a high security level without impairing convenience as a printed medium (e.g., being able to be printed on the base layer 310).

4. Modification Examples of Second Embodiment

Modification examples of the document 300 according to the above embodiment will be described below.

Modification Example F

In the second embodiment, in a case where the visible image data of the reversible data layer 320 is acquired by the image recognition section 50, the information processing section 70 may convert processed image data obtained by performing predetermined processing on the visible image data read from the storage 40 into the image data to be written on the cover layer 340. The processed image data is, for example, gray-scale image data having a pattern that differs from a pattern of the visible image data of the reversible data layer 320. For example, the processed image data may be inverted image data in which the visible image data of the reversible data layer 320 is inverted as illustrated in FIG. 18, or, for example, complicated patterned image data as illustrated in FIG. 19. At this time, the light source section 63 emits a laser light beam such that the cover layer 340 has an inverted image of a visible image or an image differing from the visible image by the application of the laser light beams performed by the scanner section 66. If input image data used for performing writing on the reversible data layer 320 is stored in the storage 40, the input image data may be used to generate the processed image data instead of acquiring the visible image data by the image recognition section 50. In other words, if writing on the reversible data layer 320 and writing on the cover layer 340 are performed by the single drawing device 1, or if input image data recorded in the reversible data layer 320 is easily referenceable when writing on the cover layer is to be performed, it is possible to omit the image recognition section 50 from the drawing device 1.

On the cover layer 340, if, for example, the inverted image data in which the visible image data is inverted as illustrated in FIG. 18 is written, the confidential information as a whole is in the visible state through the cover layer 340, but the confidential information is caused to appear, due to the cover layer 340, as a visible image (e.g., a solid image) different from the original visible image of the confidential information. Further, on the cover layer 340, if, for example, the complicated patterned image data as illustrated in FIG. 19 is written, a portion of the confidential information is in the visible state through the cover layer 340, but the confidential information is caused to appear, due to the cover layer 340, as a visible image (e.g., a striped image) different from the original visible image of the confidential information. Therefore, by performing writing on the cover layer 340, it is possible to hide the confidential information by the cover layer 340 as in the above embodiment. In contrast, by performing erasing on the cover layer 340, it is possible to visually recognize the confidential information through the cover layer 340 as in the above embodiment.

Modification Example G

In the second embodiment and the modification example thereof, out of the reversible data layer 320 and the cover layer 340, at least the cover layer 340 may include a photochromic material, for example. Examples of the photochromic material include a diarylethene compound and the like. The photochromic material is configured to transition between the color-developed state (colored state) and the decolored state in the visible wavelength region. The photochromic material has an absorption peak in the ultraviolet region in the decolored state, and when ultraviolet rays having wavelengths near the absorption peak being applied, the absorption peak shifts to the visible-light region and turns into the color-developed state. Therefore, it is possible to conceal the confidential information by applying the ultraviolet rays having the wavelengths close to the absorption peak in the decolored state to cause photochromic material to develop a color, thereby making the confidential information invisible, or by preventing, by the cover layer 340, the confidential information from being recognized. In addition, it is possible to visually recognize the confidential information by applying strong visible light close to the absorption-peak wavelength in the color-developed state to decolorize the photochromic material and visualize the cover layer 340. Therefore, also in the document 300 according to the present modification example, it is possible to visualize the confidential information in the visible wavelength region.

Modification Example H

In the second embodiment and the modification examples thereof, out of the reversible data layer 320 and the cover layer 340, at least the cover layer 340 may include, for example, a material configured to control an optical transmittance in the visible wavelength region owing to phase change, or a material configured to transition between the color-developed state and the decolored state in the visible wavelength region owing to phase change. As such a material, it is possible to use a phase change material configured to mutually transition between two phases, amorphous and crystalline phases. For example, a film of a germanium-antimony-tellurium-alloy $Ge_2Sb_2Te_5$ becomes a transparent amorphous phase when heated to a high temperature of about 600° C. and quenched, and becomes an opaque crystalline phase when heated to a medium temperature of about 160° C. and slowly cooled. By using such a phase change material for the cover layer 340, the amorphous phase can be the visible state of the confidential information, and the crystalline phase can be the invisible state of the confidential information. It is possible to conceal the confidential information by changing the phase change material into the crystalline phase to make the cover layer 340 opaque, or by preventing, by the cover layer 340, the confidential information from being recognized. In addition, it is possible to visually recognize the confidential information by changing the phase change material into the amorphous phase to make the cover layer 340 transparent. Therefore, also in the document 300 according to the present modification example, it is possible to visualize the confidential information in the visible wavelength region.

Modification Example I

In the second embodiment and the modification examples thereof, the document 300 may include, in addition to the cover layer 340, one or a plurality of cover layers having a similar function as the cover layer 340. The document 300 may further include a heat-insulating adhesive layer 350 and a cover layer 360 on a back surface of the base layer 310 (i.e., opposite side from the cover layer 340 in a position relationship with the reversible data layer 320), as illustrated in FIG. 20, for example. The heat-insulating adhesive layer 350 and the cover layer 360 are stacked in this order from the back surface of the base layer 310. The heat-insulating adhesive layer 350 is a layer of a pressure-sensitive adhesive or an adhesive for attaching the cover layer 360 to the back surface of the base layer 310, and is a layer that is able to prevent heat from propagating between the cover layer 340 and the cover layer 360. The heat-insulating adhesive layer 350 includes, for example, a pressure-sensitive adhesive or an adhesive containing a synthetic resin having a thermal conductivity of 0.3 (W/m·K) or less. The thickness of the heat-insulating adhesive layer 150 is desirably 3 μm or more, and more desirably 6 μm or more.

The cover layer 360 is a layer for hiding confidential information that is visible through the base layer 310 in a case where the base layer 310 includes a light-transmissive material. The cover layer 360 is configured to transition between the color-developed state and the decolored state in the visible wavelength region. In this case, the optical density of the color at the time of color development of the cover layer 360 may be a density at which it is not possible to visually recognize the visible image of the reversible data layer 320. The visible image of the cover layer 360 may include multiple colors or may include a single color. In a case where the visible image of the reversible data layer 320 includes the single color, a color difference $\Delta E^*$ between the reversible data layer 320 and the cover layer 360 is preferably 1.2 or less. It is to be noted that the color difference $\Delta E^*$ between the reversible data layer 320 and the cover layer 360 may be such that the visible image of the reversible data layer 320 is not visually recognizable.

When the cover layer 360 is in the color-developed state in the visible wavelength region, the cover layer 360 prevents the confidential information from being visually recognized or being recognized. In a case where the cover layer 360 prevents the confidential information from being visually recognized, a portion of or entire confidential information is caused to be in the invisible state by the cover layer 360. In contrast, in a case where the cover layer 360 prevents the confidential information from being recognized, a portion of or entire confidential information may be in the visible state through the cover layer 360, but the confidential information is caused to appear, due to the cover layer 360, as a visible image that is different from the original visible image of the confidential information.

Further, when the cover layer 360 is in the decolored state in the visible wavelength, the cover layer 360 does not prevents the confidential information from being visually recognized. At this time, the confidential information is in the visible state through the cover layer 360.

The cover layer 360 includes, for example, a leuco dye and a photothermal conversion agent for generating heat at a time of writing. The cover layer 360 further includes, for example, a developer and a polymer.

The leuco dye is combined with the developer, thereby turning into the color-developed state in the visible wavelength region, or separates from the developer, thereby turning into the decolored state in the visible wavelength region. When the cover layer 360 reaches its writing temperature by heat, the leuco dye included in the cover layer 360 is combined with the developer and develops a predetermined color in the visible wavelength region. Further, the cover layer 360 is transparent in the decolored state in the visible wavelength region. The photothermal conversion agent absorbs light of the near-infrared region (700 nm to 2500 nm), for example, and generates heat. The photothermal conversion agent included in the cover layer 360 has an absorption peak at a wavelength $\lambda 3$ ($\lambda 3 \lambda \neq 1$, $\lambda 2$, 700 nm$\leq \lambda 3 \leq$2500 nm), for example. In other words, the cover layer 360 includes a reversible material whose transition condition differs from the transition conditions of the reversible data layer 320 and the cover layer 340. In the present modification example, in a case where the cover layer 360 is disposed below the reversible data layer 320 and the cover layer 340, it is preferable that the wavelength 23 of the absorption peak of the photothermal conversion agent included in the cover layer 360 be longer than the wavelengths $\lambda 1$ and $\lambda 2$ of the absorption peaks of the photothermal conversion agents included in the reversible data layer 320 and the cover layer 340. This is for making it difficult, for example, for the laser light beam having the wavelength $\lambda 3$ to be absorbed by the reversible data layer 320 and the cover layer 340 when writing or erasing is performed on the cover layer 360 via the reversible data layer 320 and the cover layer 340 by using the drawing device 1 including the drawing section 60 of FIG. 21, which will be described later.

Next, the drawing section 60 that performs writing and erasing on the document 300 including the reversible data layer 320, the cover layer 340, and the cover layer 360 as illustrated in FIG. 20 will be described. FIG. 21 illustrates a schematic configuration example of the drawing section 60 that performs writing and erasing on the document 300 illustrated in FIG. 20. The drawing section 60 includes, for example, the signal processing circuit 61, the laser driving circuit 62, the light source section 63, the adjustment mechanism 64, the scanner driving circuit 65, and the scanner section 66. The drawing section 60 performs drawing on the document 300 by controlling an output of the light source section 63 on the basis of an output setting value inputted from the information processing section 70.

The signal processing circuit 61 acquires the output setting value inputted from the information processing section 70 as an image signal Din. The signal processing circuit 61 generates, for example, from the image signal Din, a pixel signal Dout corresponding to a scanner operation of the scanner section 66. The pixel signal Dout causes the light source section 63 (e.g., light sources 63A, 63B, and 63C to be described later) to output a laser light beam having power corresponding to the output setting value. The signal processing circuit 61 controls, together with the laser driving circuit 62, a peak value of current pulses to be applied to the light source section 63 (e.g., the light sources 63A, 63B, and 63C) depending on the signal Dout.

The laser driving circuit 62 drives each of the light sources 63A, 63B, and 63C of the light source section 63 in accordance with the pixel signal Dout, for example. The laser driving circuit 62 controls, for example, luminance (brightness) of a laser light beam for drawing an image corresponding to the pixel signal Dout. The laser driving circuit 62 includes, for example, a driving circuit 62A that drives the light source 63A, a driving circuit 62B that drives the light source 63B, and a driving circuit 62C that drives the light source 63C. The light sources 63A, 63B, and 63C each perform writing and erasing on the document 300 by outputting a laser light beam of power corresponding to the output setting value to the document 300. The light sources 63A, 63B, and 63C each emit a laser light beam in the near infrared region. The light source 63A is, for example, a laser diode that emits a laser light beam La having a wavelength $\lambda 1$. The light source 63B is, for example, a laser diode that emits a laser light beam Lb having a wavelength $\lambda 2$. The light source 63C is, for example, a laser diode that emits a laser light beam Lc having a wavelength $\lambda 3$.

The light source section 63 has a plurality of light sources differing in light emission wavelengths in the near infrared region. The light source section 63 includes, for example, three light sources 63A, 63B, and 63C. The light source section 63 further includes, for example, an optical system that multiplexes laser light beams emitted from a plurality of light sources (e.g., the three light sources 63A, 63B, and 63C). The light source section 63 includes, for example, a reflection mirror 63$a$, a dichroic mirror 63$b$, and a lens 63$e$, as such an optical system.

For example, each of the laser light beams La and Lb emitted from the two light sources 63A and 63B is converted into substantially parallel light (collimated light) by a collimating lens. Thereafter, for example, the laser light beam La is reflected by the reflection mirror 63$a$ and further reflected by the dichroic mirror 63$b$, and the laser light beam Lb passes through the dichroic mirror 63$b$, and thus the laser light beam La and the laser light beam Lb are multiplexed together. Multiplexed light of the laser light beam La and the laser light beam La is transmitted through the dichroic mirror 63$c$.

The laser light beam Lc emitted from the light source 63C is converted into substantially parallel light (collimated light) by a collimating lens. Thereafter, for example, the laser light beam Lc reflected by a reflection mirror 63$d$ and further reflected by the dichroic mirror 63$c$. Thus, the multiplexed light transmitted through the dichroic mirror 63$c$ and the laser light beam Lc reflected by the dichroic mirror 63$c$ are multiplexed together. The light source section 63, for example, outputs the multiplexed light Lm obtained by the multiplexing by the optical system to the scanner section 66.

The adjustment mechanism 64 is a mechanism for adjusting a focus of the multiplexed light Lm emitted from the light source section 63. The adjustment mechanism 64 is, for example, a mechanism for adjusting a position of the lens 63$e$ by manual manipulation of a user. It is to be noted that the adjustment mechanism 64 may be a mechanism for adjusting the position of the lens 63$e$ by mechanical manipulation.

The scanner driving circuit 65 drives the scanner section 66, for example, in synchronization with a projection image clock signal inputted from the signal processing circuit 61. Further, in a case where a signal of an irradiation angle of the two-axis scanner 66A to be described later or the like is inputted from the from scanner section 66, the scanner driving circuit 65 drives the scanner section 66 to cause the irradiation angle to be a desired irradiation angle on the basis of the signal.

The scanner section 66, for example, raster-scans the surface of the document 300 with the multiplexed light Lm outputted from the light source section 63. The scanner section 66 includes, for example, the two-axis scanner 66A and the f$\theta$ lens 66B. The two-axis scanner 66A is, for example, a galvanometer mirror. The f$\theta$ lens 66B converts a constant velocity scan by the two-axis scanner 66A into a constant velocity linear scan of a spot moving on the focal plane (the surface of the document 300). It is to be noted that the scanner section 66 may include the one-axis scanner and the f$\theta$ lens. In this case, it is preferable that a one-axis stage for displacing the document 300 in a direction perpendicular to a scanning direction of the one-axis scanner be provided.

Next, an example of performing writing on the reversible data layer 230, the cover layer 340, and the cover layer 360 by a drawing system 1 will be described.

[Writing]

First, the user prepares the reversible data layer 230, the cover layer 340, and the cover layer 360 which are uncolored and sets them in the drawing section 60. The user then instructs the information processing section 70 to perform writing through the input section 20. The information processing section 70 then converts three pieces of image data read from the storage 40 into the output setting values of the drawing section 60 for performing writing on the reversible data layer 230, the cover layer 340, and the cover layer 360, and inputs the three output setting values obtained by the conversion to the drawing section 60. The drawing section 60 performs writing on the reversible data layer 230, the cover layer 340, and the cover layer 360 on the basis of the inputted three output setting values.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam. The signal processing circuit 61 outputs the generated light emission signal to the laser driving circuit 62 of the drawing section 60.

The driving circuit 62A drives the light source 63A of the light source section 63 in accordance with a light emission signal generated from a first output setting value. The driving circuit 62B drives the light source 63B of the light source section 63 in accordance with a light emission signal generated from a second output setting value. The driving circuit 62C drives the light source 63C of the light source section 63 in accordance with a light emission signal generated from a third output setting value. At this time, the driving circuit 62A causes the laser light beam La to be emitted from the light source 63A, the driving circuit 62B causes the laser light beam Lb to be emitted from the light source 63B, the driving circuit 62C causes the laser light beam Lc to be emitted from the light source 63C, and the synthesized light Lm thereof is scanned on the document 300. As a result, the laser light beam La having the wavelength λ1 included in the synthesized light Lm is absorbed by the photothermal conversion agent in the reversible data layer 230, whereby heat generated from the photothermal conversion agent causes the reversible data layer 230 to reach the writing temperature, and the leuco dye combines with the developer to develop a predetermined color in the visible wavelength region (the upper diagram of FIG. 22). Further, the laser light beam Lb having the wavelength λ2 included in the synthesized light Lm is absorbed by the photothermal conversion agent in the cover layer 340, whereby heat generated from the photothermal conversion agent causes the cover layer 340 to reach the writing temperature, and the leuco dye combines with the developer to develop a predetermined color in the visible wavelength region (the middle diagram of FIG. 22). Further, the laser light beam Lc having the wavelength λ3 included in the synthesized light Lm is absorbed by the photothermal conversion agent in the cover layer 360, whereby heat generated from the photothermal conversion agent causes the cover layer 360 to reach the writing temperature, and the leuco dye combines with the developer to develop a predetermined color in the visible wavelength region (the lower diagram of FIG. 22). In this way, the drawing section 60 performs writing on the document 300 illustrated in FIG. 20.

Next, an example of performing erasing on the reversible data layer 230, the cover layer 340, and the cover layer 360 by the drawing device 1 will be described.

[Erasing]

First, the user prepares the reversible data layer 230, the cover layer 340, and the cover layer 360 on which writing has been performed as described above and sets them in the drawing section 60. The user then instructs the information processing section 70 to perform erasing on the cover layers 340 and 360 through the input section 20. Then, the information processing section 70 sets the output setting value such that the temperature of the cover layers 340 and 360 on which erasing is to be performed satisfies a temperature condition suitable for decoloring by heat generated by the photothermal conversion agent. The drawing section 60 performs erasing on the cover layers 340 and 360 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light sources 63B and 63C of the light source section 63 in accordance with the light emission signal. At this time, the laser driving circuit 62 causes the laser light beams Lb and Lc to be emitted from the light source 63B, and causes the laser light beams Lb and Lc to be scanned on the document 300, for example. As a result, the laser light beam Lb is absorbed by the photothermal conversion agent in the cover layer 340, whereby heat generated from the photothermal conversion agent causes the cover layer 340 to be in a temperature condition suitable for decoloring, and the leuco dye separates from the developer and is decolored (the upper diagram of FIG. 23). Further, the laser light beam Lc is absorbed by the photothermal conversion agent in the cover layer 360, whereby heat generated from the photothermal conversion agent causes the cover layer 360 to be in a temperature condition suitable for decoloring, and the leuco dye separates from the developer and is decolored (the middle diagram of FIG. 23). In this way, the drawing section 60 performs erasing on the cover layers 340 and 360.

It is to be noted that, at this time, the user may further the instruct information processing section 70 to perform erasing on the reversible data layer 320 through the input section 20. In this case, the information processing section 70 converts the image data 42 read from the storage 40 into the output setting value of the drawing section 60 and inputs the output setting value obtained by the conversion to the drawing section 60. At this time, the information processing section 70 sets the output setting value such that the temperature of the reversible data layer 320 on which erasing is to be performed satisfies a temperature condition suitable for decoloring by heat generated by the photothermal conversion agent. The drawing section 60 performs erasing on the reversible data layer 320 on the basis of the inputted output setting value.

The signal processing circuit 61 of the drawing section 60 acquires the output setting value inputted from the information processing section 70 as the image signal Din. The signal processing circuit 61 generates, on the basis of the image signal Din, a light emission signal in synchronization with the scanning operation of the scanner section 66 and in accordance with a characteristic such as a wavelength of the laser light beam, and outputs the generated light emission signal to the laser driving circuit 62 of the drawing section 60.

The laser driving circuit 62 drives the light source 63A of the light source section 63 in accordance with the light emission signal. At this time, the laser driving circuit 62 causes the laser light beam La to be emitted from the light source 63A and causes the laser light beam La to scan on the document 300, for example. As a result, for example, the laser light beam La is absorbed by the photothermal conversion agent in the reversible data layer 320, whereby heat generated from photothermal conversion agent causes the reversible data layer 320 to be in a temperature condition suitable for decoloring, and the leuco dye separates from the developer and is decolored (the lower diagram of FIG. 23). In this way, the drawing section 60 performs erasing on the reversible data layer 320.

[Effects]

Next, effects of the document 300 and the drawing device 1 according to the present modification example will be described.

In the document 300 according to the present modification example, it is possible to conceal the confidential information by causing the cover layers 340 and 360 to develop a color to make the confidential information invisible, or allowing the cover layers 340 and 360 to prevent the confidential information from being recognized. In addition, it is possible to visually recognize the confidential information in the visible wavelength region by decoloring the cover layers 340 and 360 and visualizing the confidential information. Thus, in the document 300 according to the present modification example, it is possible to visualize the confidential information in the visible wavelength region.

Further, in the present modification example, the cover layers 340 and 360 each include the leuco dye, the photothermal conversion agent, the developer, and the polymer.

Thus, by applying laser light beams having a light emission wavelength corresponding to an absorption wavelength of the photothermal conversion agent to the cover layers 340 and 360, and by heating the photothermal conversion agent, the cover layers 340 and 360 each reach the writing temperature, the developer and the leuco dye combines with each other, and it becomes possible to turn the leuco dye into the color-developed state in the visible wavelength region. Consequently, it is possible to conceal the confidential information by causing each of the cover layers 340 and 360 to develop a color to make the reversible data layer 320 invisible, or by preventing, by the cover layers 340 and 360, the confidential information from being recognized. In addition, if the cover layers 340 and 360 are each set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of each of the cover layers 340 and 360 is erased, the cover layers 340 and 360 are each turned into the decolored state, and the reversible data layer 320 is turned into the visible state, whereby it is possible to visually recognize the confidential information in the visible wavelength region. In addition, since the laser light beam of a particular wavelength is necessary for the erasing process on the cover layers 340 and 360, it is possible to achieve the document 300 having a higher security level as compared with the case where the visualization is performed simply by increasing the temperature. That is, in a case of attempting to steal the confidential information by a method other than the normal method, for example, attempting to heat the entire document 300 to turn the cover layers 340 and 360 into the decolored state, the confidential information written in the reversible data layer 320 is also decolored at the same time, so that there is no risk that the confidential information may be stolen.

In the present modification example, the reversible data layer 320, similarly to the cover layers 340 and 360, includes a reversible material configured to transition between the color-developed state and the decolored state in the visible wavelength region. However, the drawing device 1 is configured to perform the transition between color development and decoloring on only one of the reversible data layer 320 or the cover layers 340 and 360. Thus, the drawing device 1 is able to control visualization and invisualization of the confidential information by only causing the transition between color development and decoloring of the cover layers 340 and 360 to be performed. Further, the drawing device 1 is also able to perform rewriting on the reversible data layer 320.

In the present modification example, the cover layers 340 and 360 are provided so as to sandwich the base layer 310 and the reversible data layer 320 from above and below. As a result, even in a case where the base layer 310 includes a resin material which is transparent in the visible region or a material which allows the confidential information to be seen through in the visible region, the cover layers 340 and 360 are able to control visualization and invisualization of the confidential information.

Modification Example J

In the above modification example I, in a case where the image recognition section 50 acquires the visible image data of the reversible data layer 320, the information processing section 70 may convert first processed image data obtained by performing a predetermined process on the visible image data read from the storage 40 into image data to be drawn on the cover layer 340, and may also convert second processed image data obtained by performing a predetermined process the on visible image data read from the storage 40 into image data to be drawn on the cover layer 360. At this time, as illustrated in FIGS. 24 and 25, for example, the information processing section 70 generates the first processed image data and the second processed image data such that a pattern Ic obtained by superimposing a pattern Ia of the first processed image data and a pattern Ib of the second processed image data on each other is a different pattern from a pattern Id of the visible image data of the reversible data layer 320. It is to be noted that, in FIG. 25, the pattern Ic and the pattern Id are visually distinguishable, but this is for explanatory purposes only, and actually, it is difficult to visually distinguish the pattern Ic from the pattern Id.

It is to be noted that the pattern Ic may be a pattern obtained by inverting the pattern Id, for example, as illustrated in FIG. 25, or may be a complex stripe pattern, for example, as illustrated in FIG. 26. At this time, the light source section 63 emits a laser light beam such that the cover layers 340 and 360 each become an inverted image of a visible image or an image differing from the visible image by the application of the laser light beams by the scanner section 66. In a case where the pattern Ic is a pattern obtained by inverting the pattern Id, it is difficult to visually distinguish the pattern Ic from the pattern Id; therefore, even if measurement is performed by a device for measuring a transmittance as well as by visual inspection, the transmittance is constant regardless of which part is measured, so that it is possible to effectively conceal the confidential information. Further, in a case where the pattern Ic is a complex stripe pattern, it is difficult to recognize the confidential information by visual inspection; therefore, it is possible to effectively conceal the confidential information.

Modification Example K

In the second embodiment and the modification examples thereof, the document 300 may include, instead of the reversible data layer 320, a data layer 370 on which the confidential information is recorded as the visible image. The data layer 370 is, for example, a print layer in which the confidential information is irreversibly fixed on the base layer 310, and includes, for example, a visible image formed by offset printing. It is to be noted that the data layer 370 may be a character or a picture handwritten on the base layer 310. The data layer 370 includes visible images such as numbers, letters, bar codes, two-dimensional codes, photographs, and figures, for example. At this time, the optical density of the color at the time of color development of the cover layer 340 may be a density at which it is not possible to visually recognize the visible image of the data layer 370. The visible image of the cover layer 340 may include multiple colors or may include a single color. In a case where the visible image of the data layer 370 includes the single color, a color difference $\Delta E^*$ between the data layer 370 and the cover layer 340 is preferably 1.2 or less. It is to be noted that the color difference $\Delta E^*$ between the data layer 370 and cover layer 340 may be such that the visible image of the data layer 370 is not visually recognizable.

Even in such a case, it is possible to conceal the confidential information by causing the cover layer 340 to develop a color to make the data layer 370 invisible, or by preventing, by the cover layer 340, the confidential information from being recognized. Further, by turning the cover layer 340 into the decolored state and visualizing the data layer 370, it is possible to visually recognize the confidential information in the visible wavelength region. Therefore, the document 300 according to the present modification example is able to visualize the confidential information in the visible wavelength region.

5. Third Embodiment

[Configuration]

A card 400 according to a third embodiment of the present disclosure will be described. FIG. 28 illustrates a schematic configuration example of the card 400 according to the present embodiment. The card 400 includes, for example: a base layer 410; and a reversible data layer 420, a heat-insulating adhesive layer 430, and a cover layer 440 that are formed over the base layer 410. The reversible data layer 420, the heat-insulating adhesive layer 430, and the cover layer 440 are stacked in this order over the base layer 410. Positions of the reversible data layer 420 and the cover layer 440 may be exchanged. The heat-insulating adhesive layer 430 and the cover layer 440 are provided at positions opposed to the reversible data layer 420.

The base layer 410 includes an opaque resin material, for example. The heat-insulating adhesive layer 430 is a layer for attaching the cover layer 440 to the reversible data layer 420, and is a layer that is able to prevent heat from propagating between the cover layer 440 and the reversible data layer 420. The heat-insulating adhesive layer 430 includes, for example, a pressure-sensitive adhesive or an adhesive containing a synthetic resin having a thermal conductivity of 0.3 (W/m·K) or less. The thickness of the heat-insulating adhesive layer 330 is desirably 3 μm or more, and more desirably 6 μm or more.

The reversible data layer 420 and the cover layer 440 are each configured to transition between the color-developed state and the decolored state in the visible wavelength region. The cover layer 440 includes a reversible material whose transition condition differs from a transition condition of the reversible data layer 420. In other words, the reversible data layer 420 includes the reversible material whose transition condition differs from the transition condition of the cover layer 440. At this time, an optical density of a color at a time of color development of the cover layer 440 may be a density at which it is not possible to visually recognize a visible image of the reversible data layer 420. A visible image of the cover layer 440 may include multiple colors or may include a single color. In a case where the visible image of the reversible data layer 420, a color difference ΔE* between the reversible data layer 420 and the cover layer 440 is preferably 1.2 or less. It is to be noted that the color difference ΔE* between the reversible data layer 420 and the cover layer 440 may be such that the visible image of the reversible data layer 420 is not visually recognizable.

The cover layer 440 is a layer for hiding confidential information written on the reversible data layer 420. When the cover layer 440 is in the color-developed state in the visible wavelength region, the cover layer 440 prevents the confidential information from being visually recognized or being recognized. In a case where the cover layer 440 prevents the confidential information from being visually recognized, a portion of or entire confidential information is caused to be in the invisible state by the cover layer 440. In contrast, in a case where the cover layer 440 prevents the confidential information from being recognized, a portion of or entire confidential information may be in the visible state through the cover layer 440, but the confidential information is caused to appear, due to the cover layer 440, as a visible image that is different from the original visible image of the confidential information.

Further, when the cover layer 440 is in the decolored state in the visible wavelength, the cover layer 440 does not prevents the confidential information from being visually recognized. At this time, the confidential information is in the visible state through the cover layer 440.

The reversible data layer 420 includes, for example, a leuco dye and a photothermal conversion agent for generating heat at a time of writing. The reversible data layer 420 further includes, for example, a developer and a polymer.

The leuco dye is combined with the developer, thereby turning into the color-developed state in the visible wavelength region, or separates from the developer, thereby turning into the decolored state in the visible wavelength region. When the reversible data layer 420 reaches its writing temperature by heat, the leuco dye included in the reversible data layer 420 is combined with the developer and develops a predetermined color in the visible wavelength region. Further, the reversible data layer 420 is transparent in the decolored state in the visible wavelength region. The photothermal conversion agent absorbs light of the near-infrared region (700 nm to 2500 nm), for example, and generates heat. The photothermal conversion agent included in the reversible data layer 420 has an absorption peak at the wavelength $\lambda_1$ (700 nm≤$\lambda_1$≤2500 nm), for example.

The cover layer 440 includes, for example, a leuco dye and a photothermal conversion agent for generating heat at a time of writing. The cover layer 440 further includes, for example, a developer and a polymer.

The leuco dye is combined with the developer, thereby turning into the color-developed state in the visible wavelength region, or separates from the developer, thereby turning into the decolored state in the visible wavelength region. When the cover layer 440 reaches its writing temperature by heat, the leuco dye included in the cover layer 440 is combined with the developer and develops a predetermined color in the visible wavelength region. Further, the cover layer 440 is transparent in the decolored state in the visible wavelength region. The photothermal conversion agent absorbs light of the near-infrared region (700 nm to 2500 nm), for example, and generates heat. The photothermal conversion agent included in the cover layer 440 has an absorption peak at the wavelength $\lambda_2$ ($\lambda_2 \neq \lambda_1$, 700 nm≤$\lambda_2$≤2500 nm), for example. In the present embodiment, in a case where the reversible data layer 420 is disposed below the cover layer 440, the wavelength $\lambda_1$ of the absorption peak of the photothermal conversion agent included in the reversible data layer 420 is preferably longer than the wavelength $\lambda_2$ of the absorption peak of the photothermal conversion agent included in the cover layer 440. This is for making it difficult, for example, for the laser light beam having the wavelength $\lambda_1$ to be absorbed by the cover layer 440 when writing or erasing is performed on the reversible data layer 420 via the cover layer 440 by using the drawing device 1 including the drawing section 60 of FIG. 9. Further, in the present embodiment, in a case where the cover layer 440 is disposed below the reversible data layer 420, the wavelength $\lambda_2$ of the absorption peak of the photothermal conversion agent included in the cover layer 440 is preferably longer than the wavelength $\lambda_1$ of the absorption peak of the photothermal conversion agent included in the reversible data layer 420. This is for making it difficult, for example, for the laser light beam having the wavelength $\lambda_2$ to be absorbed by the reversible data layer 420 when writing or erasing is performed on the cover layer 440 via the reversible data layer 420 by using the drawing device 1 including the drawing section 60 of FIG. 9.

It is possible to perform writing and erasing on the reversible data layer 420 and the cover layer 440 in the similar way as writing and erasing to be performed on the reversible data layer 320 and the cover layer 340 according to the second embodiment.

[Effects]

Next, effects of the card 400 according to the present embodiment will be described.

In the card 400 according to the present embodiment, it is possible to cause the cover layer 440 to develop a color to make the confidential information invisible, or allowing the cover layer 440 to prevent the confidential information from being recognized. In addition, it is possible to visually recognize the confidential information in the visible wavelength region by decoloring the cover layer 440 and visualizing the confidential information. Thus, in the card 400 according to the present modification example, it is possible to visualize the confidential information in the visible wavelength region.

Further, in the present embodiment, the cover layer 440 includes the leuco dye, the photothermal conversion agent, the developer, and the polymer. Thus, by applying laser light beams having a light emission wavelength corresponding to an absorption wavelength of the photothermal conversion agent to the cover layer 440, and by heating the photothermal conversion agent, the cover layer 440 reaches the writing temperature, the developer and the leuco dye combines with each other, and it becomes possible to turn the leuco dye into the color-developed state in the visible wavelength region. Consequently, it is possible to conceal the confidential information by causing the cover layer 440 to develop a color to make the reversible data layer 420 invisible, or by preventing, by the cover layer 440, the confidential information from being recognized. In addition, if the cover layer 440 is set to a temperature condition suitable for decoloring by the heat generated by the application of the laser light beams, the developer and the leuco dye are separated from each other, and it is possible to turn the leuco dye into the decolored state in the visible wavelength region. Consequently, the visible image of the cover layer 440 is erased, the cover layer 440 is turned into the decolored state, and the reversible data layer 420 is turned into the visible state, whereby it is possible to visually recognize the confidential information in the visible wavelength region. In addition, since the laser light beam of a particular wavelength is necessary for the erasing process on the cover layer 440, it is possible to achieve the card 400 having a higher security level as compared with the case where the visualization is performed simply by increasing the temperature. That is, in a case of attempting to steal the confidential information by a method other than the normal method, for example, attempting to heat the entire card 400 to turn the cover layer 440 into the decolored state, the confidential information written in the reversible data layer 420 is also decolored at the same time, so that there is no risk that the confidential information may be stolen.

In the present embodiment, the reversible data layer 420, similarly to the cover layer 440, includes a reversible material configured to transition between the color-developed state and the decolored state in the visible wavelength region. However, the reversible data layer 420 includes the reversible material whose transition condition differs from the transition condition of the cover layer 440. In other words, the cover layer 440 includes the reversible material whose transition condition differs from the transition condition of the reversible data layer 420. As a result, the drawing device 1 is able to perform the transition between color development and decoloring on only one of the reversible data layer 420 or the cover layer 440. Consequently, the drawing device 1 is able to control visualization and invisualization of the confidential information by only causing the transition between color development and decoloring of the cover layer 440 to be performed. Further, the drawing device 1 is also able to perform rewriting on the reversible data layer 420.

Further, in the present embodiment, the heat-insulating adhesive layer 430 is provided between the cover layer 440 and the reversible data layer 420; therefore, the heat-insulating adhesive layer 430 prevents heat from propagated between the cover layer 440 and the reversible data layer 420. Thus, for example, when color development or decoloring is performed on the cover layer 440, it is possible to prevent the color development or decoloring from being erroneously performed on the reversible data layer 420.

In the present embodiment, the card 400 may have the similar configuration as the modification examples F, G, H, I, and J. Further, in the present embodiment, for example, as illustrated in FIG. 29, instead of the reversible data layer 420, a data layer 450 on which the confidential information is recorded as the visible image may be included. The data layer 450 is a print layer in which the confidential information is irreversibly fixed on the base layer 410, and includes, for example, a visible image formed by offset printing. It is to be noted that the data layer 450 may be a character or a picture handwritten on the base layer 410. The data layer 450 includes visible images such as numbers, letters, bar codes, two-dimensional codes, photographs, and figures, for example. Even in such a case, it is possible to conceal the confidential information by causing the cover layer 440 to develop a color to make the reversible data layer 420 invisible, or by preventing, by the cover layer 440, the confidential information from being recognized. By turning the cover layer 440 into the decolored state and visualizing the reversible data layer 420, it is possible to visually recognize the confidential information in the visible wavelength region. Therefore, even in such a case, the document 300 is able to visualize the confidential information in the visible wavelength region.

7. Modification Examples Common to Each Embodiment

Modification Example M

In the first embodiment and the modification examples thereof, the data protection seal 100 may include, for example, a pair of water vapor barrier layers 160 that sandwiches the cover layer 110 from above and below, as illustrated in FIG. 30. Either one of the pair of water vapor barrier layers 160 may be omitted as necessary. The water vapor barrier layer 160 protects the cover layer 110 and has, for example, a water vapor permeability of 0.1 $g/m^2/day$ or less. As described above, by providing the water vapor barrier layer 160, it is possible to suppress natural decoloring of the cover layer 110 and keep the confidential information in a confidential state for a long period of time even under a severe environment.

Further, in the first embodiment and the modification examples thereof, the data protection seal 100 may include, for example, a pair of ultraviolet protection layers 170 that sandwiches the cover layer 110 from above and below, as illustrated in FIG. 31. The ultraviolet protection layer 170 protects the cover layer 110 and has, for example, an optical transmittance of light having a wavelength shorter than 420 nm of 70% or less. Either one of the pair of ultraviolet protection layers 170 may be omitted as necessary. As described above, by providing the ultraviolet protection layer 170, it is possible to suppress natural decoloring of the cover layer 110 and keep the confidential information in a confidential state for a long period of time even under a severe environment.

Further, in the first embodiment and the modification examples thereof, the data protection seal 100 may include, for example, as illustrated in FIG. 32, the pair of water vapor barrier layers 160 that sandwiches the cover layer 110 in the vertical direction, and the pair of ultraviolet protection layers 170 that sandwiches the cover layer 110 in the vertical direction. Either one of the pair of water vapor barrier layers 160 may be omitted as necessary. Either one of the pair of ultraviolet protection layers 170 may be omitted as necessary. As described above, by providing the water vapor barrier layer 160 or the ultraviolet protection layer 170, it is possible to suppress natural decoloring of the cover layer 110 and keep the confidential information in a confidential state for a long period of time even under a severe environment.

Modification Example N

In the second embodiment and the modification examples thereof, the document 300 may include, for example, a pair of water vapor barrier layers 380 that sandwiches the cover layer 340 from above and below, as illustrated in FIG. 33. Either one of the pair of water vapor barrier layers 380 may be omitted as necessary. The water vapor barrier layer 380 protects the cover layer 340 and has, for example, a water vapor permeability of 0.1 g/m$^2$/day or less. As described above, by providing the water vapor barrier layer 380, it is possible to suppress natural decoloring of the cover layer 340 and keep the confidential information in a confidential state for a long period of time even under a severe environment.

Further, in the second embodiment and the modification examples thereof, the document 300 may include, for example, a pair of ultraviolet protection layers 390 that sandwiches the cover layer 340 from above and below, as illustrated in FIG. 34. The ultraviolet protection layer 390 protects the cover layer 340 and has, for example, an optical transmittance of light having a wavelength shorter than 420 nm of 70% or less. Either one of the pair of ultraviolet protection layers 390 may be omitted as necessary. As described above, by providing the ultraviolet protection layer 390, it is possible to suppress natural decoloring of the cover layer 340 and keep the confidential information in a confidential state for a long period of time even under a severe environment.

Further, in the second embodiment and the modification examples thereof, the document 300 may include, for example, as illustrated in FIG. 35, the pair of water vapor barrier layers 380 that sandwiches the cover layer 340 in the vertical direction, and the pair of ultraviolet protection layers 390 that sandwiches the cover layer 340 in the vertical direction. Either one of the pair of water vapor barrier layers 380 may be omitted as necessary. Either one of the pair of ultraviolet protection layers 390 may be omitted as necessary. As described above, by providing the water vapor barrier layer 380 or the ultraviolet protection layer 390, it is possible to suppress natural decoloring of the cover layer 340 and keep the confidential information in a confidential state for a long period of time even under a severe environment.

Modification Example O

In the third embodiment and the modification examples thereof, the card 400 may include, for example, a pair of water vapor barrier layers 460 that sandwiches the cover layer 440 from above and below, as illustrated in FIG. 36. Either one of the pair of water vapor barrier layers 460 may be omitted as necessary. The water vapor barrier layer 460 protects the cover layer 440 and has, for example, a water vapor permeability of 0.1 g/m$^2$/day or less. As described above, by providing the water vapor barrier layer 460, it is possible to suppress natural decoloring of the cover layer 440 and keep the confidential information in a confidential state for a long period of time even under a severe environment.

Further, in the third embodiment and the modification examples thereof, the card 400 may include, for example, a pair of ultraviolet protection layers 470 that sandwiches the cover layer 440 from above and below, as illustrated in FIG. 37. The ultraviolet protection layer 470 protects the cover layer 440 and has, for example, an optical transmittance of light having a wavelength shorter than 420 nm of 70% or less. Either one of the pair of ultraviolet protection layers 470 may be omitted as necessary. As described above, by providing the ultraviolet protection layer 470, it is possible to suppress natural decoloring of the cover layer 440 and keep the confidential information in a confidential state for a long period of time even under a severe environment.

Further, in the third embodiment and the modification examples thereof, the card 400 may include, for example, as illustrated in FIG. 38, the pair of water vapor barrier layers 460 that sandwiches the cover layer 440 in the vertical direction, and the pair of ultraviolet protection layers 470 that sandwiches the cover layer 440 in the vertical direction. Either one of the pair of water vapor barrier layers 460 may be omitted as necessary. Either one of the pair of ultraviolet protection layers 470 may be omitted as necessary. As described above, by providing the water vapor barrier layer 460 or the ultraviolet protection layer 470, it is possible to suppress natural decoloring of the cover layer 440 and keep the confidential information in a confidential state for a long period of time even under a severe environment.

In the modification examples M to O, only the cover layer is sandwiched between at least one of the water vapor barrier layer or the ultraviolet protection layer. However, in the modification examples M to O, it is more preferable that the cover layer and the reversible data layer are both sandwiched between at least one of the water vapor barrier layer or the ultraviolet protection layer. This is because it is possible to suppress natural decoloring of the reversible data layer and keep the confidential information in a confidential state for a long period of time even under a severe environment.

Although the disclosure is described hereinabove with reference to the example embodiments and modification examples, these embodiments and modification examples are not to be construed as limiting the scope of the disclosure and may be modified in a wide variety of ways.

It should be appreciated that the effects described herein are mere examples. Effects of an example embodiment and modification examples of the disclosure are not limited to those described herein. The disclosure may further include any effects other than those described herein.

Moreover, the present disclosure may have the following configurations.

(1)

A data protector including:
a data layer configured to record confidential information as a visible image; and
one or a plurality of cover layers disposed at least one of above or below the data layer and configured to transition between a color-developed state and a decolored state in a visible wavelength region.

(2)

The data protector according to (1), in which
the data layer is configured to transition between the color-developed state and the decolored state in the visible wavelength region, and includes a reversible material whose transition condition differs from a transition condition of the one or the plurality of cover layers, and
the confidential information is recorded, owing to color development of the reversible material, on the data layer as the visible image.

(3)

The data protector according to (1) or (2), in which the one or the plurality of cover layers includes a leuco dye.

(4)

The data protector according to (1) or (2), in which the one or the plurality of cover layers includes a photochromic material.

(5)

The data protector according to (1) or (2), in which the one or the plurality of cover layers includes a material configured to control an optical transmittance in the visible wavelength region owing to phase change, or a material configured to transition between the color-developed state and the decolored state in the visible wavelength region owing to phase change.

(6)

The data protector according to any one of (1) to (5), in which the one or the plurality of cover layers includes a gray-scale image having a pattern that differs from a pattern of the visible image.

(7)

The data protector according to any one of (1) to (6), further including one or a plurality of water vapor barrier layers that protects the one or the plurality of cover layers and has a water vapor permeability of 0.1 $g/m^2/day$ or less.

(8)

The data protector according to any one of (1) to (7), further including one or a plurality of ultraviolet protection layers that protects the one or the plurality of cover layers and has an optical transmittance of light having a wavelength shorter than 420 nm of 70% or less.

(9)

The data protector according to any one of (1) to (8), further including a heat-insulating layer between the one or the plurality of cover layers and the data layer.

(10)

The data protector according to any one of (1) to (9), further including a base that supports the data layer, in which the base includes paper.

(11)

The data protector according to any one of (1) to (9), further including a base that supports the data layer, in which the base includes a synthetic resin.

(12)

A data protector including:
a data layer on which confidential information is recorded as a visible image; and
one or a plurality of cover layers disposed at least one of above or below the data layer and configured to transition between a color-developed state and a decolored state in a visible wavelength region.

(13)

The data protector according to (12), in which the data layer is a print layer in which the confidential information is irreversibly fixed on a base.

(14)

A data protection seal that protects a data layer configured to record confidential information as a visible image, the data protection seal including:
one or a plurality of cover layers configured to transition between a color-developed state and a decolored state in a visible wavelength region; and
an adhesive layer provided at a position opposed to the one or the plurality of cover layers.

(15)

The data protection seal according to (14), in which the one or the plurality of cover layers includes a reversible material whose transition condition differs from a transition condition of the data layer.

(16)

The data protection seal according to (14) or (15), further including a protective layer that protects the adhesive layer.

(17)

A data protection seal that protects a data layer on which confidential information is recorded as a visible image, the data protection seal including:
one or a plurality of cover layers configured to transition between a color-developed state and a decolored state in a visible wavelength region; and
an adhesive layer provided at a position opposed to the one or the plurality of cover layers.

(18)

The data protection seal according to (17), further including a protective layer that protects the adhesive layer.

(19)

A drawing device that performs at least one of writing or erasing on a data layer and one or a plurality of cover layers of a data protector, the data protector including the data layer on which confidential information is to be recorded as a visible image and the one or the plurality of cover layers, the data layer including a first reversible material configured to transition between a color-developed state and a decolored state in a visible wavelength region, the one or the plurality of cover layers including a second reversible material configured to transition between the color-developed state and the decolored state in the visible wavelength region and being disposed at least one of above or below the data layer, the drawing device including:
a light source section that emits laser light beams, the laser light beams being at least one of a first laser light beam or a second laser light beam, the first laser light beam having a condition in which a reaction of color development and decoloring of the first reversible material does not occur and in which a reaction of any one of color development and decoloring of the second reversible material occurs, the second laser light beam having a condition in which a reaction of color development and decoloring of the second reversible material does not occur and in which a reaction of any one of color development and decoloring of the first reversible material occurs; and an optical section that performs at least one of writing or erasing on the data layer or the one or the plurality of cover layers by applying the laser light beams emitted from the light source section on the data layer or the one or the plurality of cover layers.

(20)

The drawing device according to (19), in which the light source section emits laser light beams that cause the one or the plurality of cover layers to have an inverted image of the visible image or an image differing from the visible image by the application of the laser light beams performed by the optical section.

According to the first and second data protectors according to an embodiment of the present disclosure, it is possible to conceal the confidential information by turning the one or the plurality of cover layers into the color-developed state to turn the data layer into the invisible state, or by preventing, by the cover layer, the confidential information from being recognized, and it is possible to visually recognize the confidential information in the visible wavelength region by turning the one or the plurality of cover layers into the decolored state to turn the data layer into the visible state; therefore, it is possible to visualize the confidential information in the visible wavelength region.

According to the first and second data protection seals according to an embodiment of the present disclosure, it is possible to conceal the confidential information, for example, by attaching the first and second data protection seals to the data layer and turning the one or the plurality of cover layers into the color-developed state to turn the data layer into the invisible state, or by preventing, by the cover layer, the confidential information from being recognized, and it is possible to visually recognize the confidential information in the visible wavelength region by turning the one or the plurality of cover layers into the decolored state to turn the data layer into the visible state; therefore, it is possible to visualize the confidential information in the visible wavelength region.

According to the drawing device according to an embodiment of the present disclosure, it is possible to conceal the confidential information by performing writing on the data protector by the drawing device and turning the one or the plurality of cover layers into the color-developed state to turn the data layer into the invisible state, or by preventing, by the cover layer, the confidential information from being recognized, and it is possible to visually recognize the confidential information in the visible wavelength region by performing erasing on the data protector by the drawing device and turning the one or the plurality of cover layers into the decolored state to turn the data layer into the visible state; therefore, it is possible to visualize the confidential information in the visible wavelength region.

This application claims the benefit of Japanese Priority Patent Application JP2019-052744 filed with the Japan Patent Office on Mar. 20, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A data protector comprising:
a data layer configured to record confidential information as a visible image; and
one or a plurality of cover layers disposed at least one of above or below the data layer and configured to transition between a color-developed state and a decolored state in a visible light wavelength region,
wherein the one or a plurality of cover layers includes a leuco dye,
wherein
the data layer is configured to transition between the color-developed state and the decolored state in the visible light wavelength region, and includes a reversible material whose transition condition differs from a transition condition of the one or the plurality of cover layers, and
the confidential information is recorded, due to color development of the reversible material, on the data layer as the visible image.

2. The data protector according to claim 1, wherein the one or the plurality of cover layers includes a photochromic material.

3. The data protector according to claim 1, wherein the one or the plurality of cover layers includes a material configured to control an optical transmittance in the visible light wavelength region due to phase change, or a material configured to transition between the color-developed state and the decolored state in the visible light wavelength region due to phase change.

4. The data protector according to claim 1, wherein the one or the plurality of cover layers includes a gray-scale image having a pattern that differs from a pattern of the visible image.

5. The data protector according to claim 1, wherein the data protector includes
one or a plurality of water vapor barrier layers that protects the one or the plurality of cover layers and has a water vapor permeability of 0.1 g/m²/day or less.

6. The data protector according to claim 1, wherein the data protector includes one or a plurality of ultraviolet protection layers that protects the one or the plurality of cover layers and has an optical transmittance of 70% or less for light having a wavelength shorter than 420 nm.

7. The data protector according to claim 1, further comprising a heat-insulating layer between the one or the plurality of cover layers and the data layer.

8. The data protector according to claim 1, further comprising a base that supports the data layer, wherein the base includes paper.

9. The data protector according to claim 1, further comprising a base that supports the data layer, wherein the base includes a synthetic resin.

10. A drawing device that performs at least one of writing or erasing on a data layer and one or a plurality of cover layers of a data protector, the data protector including the data layer on which confidential information is to be recorded as a visible image and the one or the plurality of cover layers, the data layer including a first reversible material configured to transition between a color-developed state and a decolored state in a visible light wavelength region, the one or the plurality of cover layers including a second reversible material configured to transition between the color-developed state and the decolored state in the light visible wavelength region and being disposed at least one of above or below the data layer, the drawing device comprising:
a light source section that emits laser light beams, the laser light beams being at least one of a first laser light beam or a second laser light beam, the first laser light beam having a condition in which a reaction of color development and decoloring of the first reversible material does not occur and in which a reaction of any one of color development and decoloring of the second reversible material occurs, the second laser light beam having a condition in which a reaction of color development and decoloring of the second reversible material does not occur and in which a reaction of any one of color development and decoloring of the first reversible material occurs; and an optical section that performs at least one of writing or erasing on the data layer or the one or the plurality of cover layers by applying the laser light beams emitted from the light source section on the data layer or the one or the plurality of cover layers.

11. The drawing device according to claim 10, wherein the light source section emits laser light beams that cause the one or the plurality of cover layers to have an inverted image of the visible image or an image differing from the visible image by the application of the laser light beams performed by the optical section.

12. A data protector comprising:
a data layer configured to record confidential information as a visible image;
one or a plurality of cover layers disposed at least one of above or below the data layer and configured to transition between a color-developed state and a decolored state in a visible light wavelength region, wherein the one or a plurality of cover layers includes a leuco dye;
a heat-insulating layer between the one or the plurality of cover layers and the data layer; and
one or a plurality of water vapor barrier layers that protects the one or the plurality of cover layers and has a water vapor permeability of 0.1 g/m²/day or less.

13. The data protector according to claim 12, wherein the one or the plurality of cover layers includes a photochromic material.

14. The data protector according to claim 12, wherein the one or the plurality of cover layers includes a material configured to control an optical transmittance in the visible light wavelength region due to phase change, or a material configured to transition between the color-developed state and the decolored state in the visible light wavelength region due to phase change.

15. The data protector according to claim 12, wherein the one or the plurality of cover layers includes a gray-scale image having a pattern that differs from a pattern of the visible image.

16. A data protector comprising:
a data layer configured to record confidential information as a visible image;
one or a plurality of cover layers disposed at least one of above or below the data layer and configured to transition between a color-developed state and a decolored state in a visible light wavelength region, wherein the one or a plurality of cover layers includes a leuco dye;
a heat-insulating layer between the one or the plurality of cover layers and the data layer; and one or a plurality of ultraviolet protection layers that protects the one or the plurality of cover layers and has an optical transmittance of 70% or less for light having a wavelength shorter than 420 nm.

17. The data protector according to claim 12, further comprising a base that supports the data layer, wherein the base includes paper.

18. The data protector according to claim 12, further comprising a base that supports the data layer, wherein the base includes a synthetic resin.

* * * * *